US011244010B2

(12) United States Patent
Isherwood et al.

(10) Patent No.: US 11,244,010 B2
(45) Date of Patent: Feb. 8, 2022

(54) CONTENT CLASSES FOR OBJECT STORAGE INDEXING SYSTEMS

(71) Applicant: Hitachi Vantara LLC, Santa Clara, CA (US)

(72) Inventors: Benjamin Isherwood, Tewksbury, MA (US); David Charubini, East Walpole, MA (US); Alan Bryant, Walpole, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 579 days.

(21) Appl. No.: 15/781,164

(22) PCT Filed: Feb. 17, 2016

(86) PCT No.: PCT/US2016/018161
§ 371 (c)(1),
(2) Date: Jun. 4, 2018

(87) PCT Pub. No.: WO2017/142519
PCT Pub. Date: Aug. 24, 2017

(65) Prior Publication Data

US 2018/0357333 A1 Dec. 13, 2018

(51) Int. Cl.
*G06F 16/907* (2019.01)
*G06F 16/33* (2019.01)
(Continued)

(52) U.S. Cl.
CPC ............ *G06F 16/907* (2019.01); *G06F 16/33* (2019.01); *G06F 16/81* (2019.01); *G06F 16/901* (2019.01)

(58) Field of Classification Search
CPC ........ G06F 16/907; G06F 16/33; G06F 16/81; G06F 16/901
(Continued)

(56) References Cited

U.S. PATENT DOCUMENTS 7,805,444 B2 * 9/2010 Roche ..................... G06F 40/56 707/736
8,719,263 B1 * 5/2014 Nair ...................... G06F 16/289 707/736
(Continued)

FOREIGN PATENT DOCUMENTS

WO WO-2014133495 A1 * 9/2014 .......... G06F 16/289

OTHER PUBLICATIONS

International Search Report of PCT/US2016/018161 dated May 2, 2016.
(Continued)

*Primary Examiner* — Michael Pham
(74) *Attorney, Agent, or Firm* — Mattingly & Malur, PC

(57) ABSTRACT

In some examples, a system may use content classes to manage indexing of object data. A content class may include a set of one or more content properties. Each content property may include a name, an expression for extracting data, and an expression type. When object data is received, such as for indexing, the expression type of each content property may be compared with the data type of the received data. Based at least in part on determining that the expression type matches the data type, the system may extract a data value from the received data in accordance with the expression. The system may save the extracted data value to a data structure in association with the name of the content property, and may subsequently use the data value and the name of the content property when creating an index for the object data.

20 Claims, 18 Drawing Sheets

(51) Int. Cl.
*G06F 16/81* (2019.01)
*G06F 16/901* (2019.01)

(58) Field of Classification Search
USPC .......................................................... 707/736
See application file for complete search history.

(56) References Cited

U.S. PATENT DOCUMENTS

| | | | | |
|---|---|---|---|---|
| 8,849,764 | B1 * | 9/2014 | Long ..................... | G06F 16/907 707/646 |
| 9,183,203 | B1 | 11/2015 | Tuchman et al. | |
| 2011/0099163 | A1 * | 4/2011 | Harris .................... | G06Q 10/10 707/723 |
| 2011/0106802 | A1 | 5/2011 | Pinkey et al. | |
| 2011/0153582 | A1 * | 6/2011 | Buchmann ........ | G06F 16/24573 707/706 |
| 2012/0166403 | A1 | 6/2012 | Kim et al. | |
| 2013/0212352 | A1 | 8/2013 | Anderson | |
| 2013/0226942 | A1 | 8/2013 | Denoual et al. | |
| 2014/0172775 | A1 * | 6/2014 | Niehoff ................. | G06F 16/211 707/600 |
| 2015/0278311 | A1 * | 10/2015 | Isherwood ............ | G06F 16/245 707/741 |
| 2016/0154833 | A1 * | 6/2016 | Isherwood, Jr. .. | G06F 16/24573 707/741 |
| 2017/0060856 | A1 * | 3/2017 | Turtle ..................... | G06F 16/93 |

OTHER PUBLICATIONS

Extended European Search Report received in corresponding European Application No. 16890819.2 dated Jul. 4, 2019.

* cited by examiner

| | ATTRIBUTE NAME | DATATYPE | VALUE |
|---|---|---|---|
| | NAME | STRING | /MYDIR/X-RAY.JPB |
| | SIZE | LONG | 39025 |
| | OWNER | STRING | JOHN DOE |
| | HASH | STRING | 38562929A85EF4392BDOA |
| | VERSION | LONG | 75 |
| | INGEST TIME | DATETIME | 2011-08-01T08:37:25-0400 |
| | CHANGE TIME | DATETIME | 2012-09-28T12:33:48-0400 |
| | RETENTION | STRING | A+35D |
| | RETENTION HOLD | BOOLEAN | FALSE |
| | SHRED | BOOLEAN | FALSE |
| | DPL | INTEGER | 2 |
| | INDEX | BOOLEAN | TRUE |
| | CUSTOMMETADATAEXISTS | BOOLEAN | TRUE |
| | ACL | ACLTYPE | WILMA+R,SALLYG+RW |

400

| | 402 NAME | 404 EXPRESSION TYPE | 406 EXPRESSION |
|---|---|---|---|
| 408 | patientFirstName | XML | /Patient/name/given |
| 410 | patientGender | XML | /Patient/gender |
| 412 | patientGender | XML | /record/123456/gender |
| 414 | patientGender | JSON | $.Patient..gender |
| 416 | emailAddress | Pattern | \b[\w.%-]+@[-.\w]+.[A-Za-z]{2,4}\b |
| 418 | socialSecurityNumber | Pattern | [0-9]{3}-[0-9]{2}-[0-9]{4} |

| doctorName | Document ID |
|---|---|
| ⋮ | |
| Smith, Jeffery | 123AB33, 3C42E23 |
| Smith, John | C489032, 34244BC, 232F783 |
| Smith, Jonathan | 9876CD2 |
| Smith, Joseph | 87E4255, 46A6322 |
| ⋮ | |

FIG. 11

Content Class Extraction - JSON

Content Properties | Extract Fields

Paste XML or JSON, or drag and drop a file, into the field below to generate XPath or JSONPath expressions which will be used to extract metadata field values when this content class is used in a processing pipeline

XML | JSON

```
1  {
2    readme : "Paste an example of your JSON document here
3             to extract content properties into this content class",
4    test : {
5      tag1: tag1-value,
6      tag2: tag2-value
7    }
8  }
9
```

Search 🔍

| Name | Expression | | Select All ☐ |
|------|------------|---|---|
| rootReadme | $..readme | | ☐ |
| rootTest | $..test | | ☐ |
| test | $.test | | ☐ |
| testTag1 | $.test..tag1 | | ☑ |
| testTag2 | $.test..tag2 | | ☑ |

Add Selected Properties

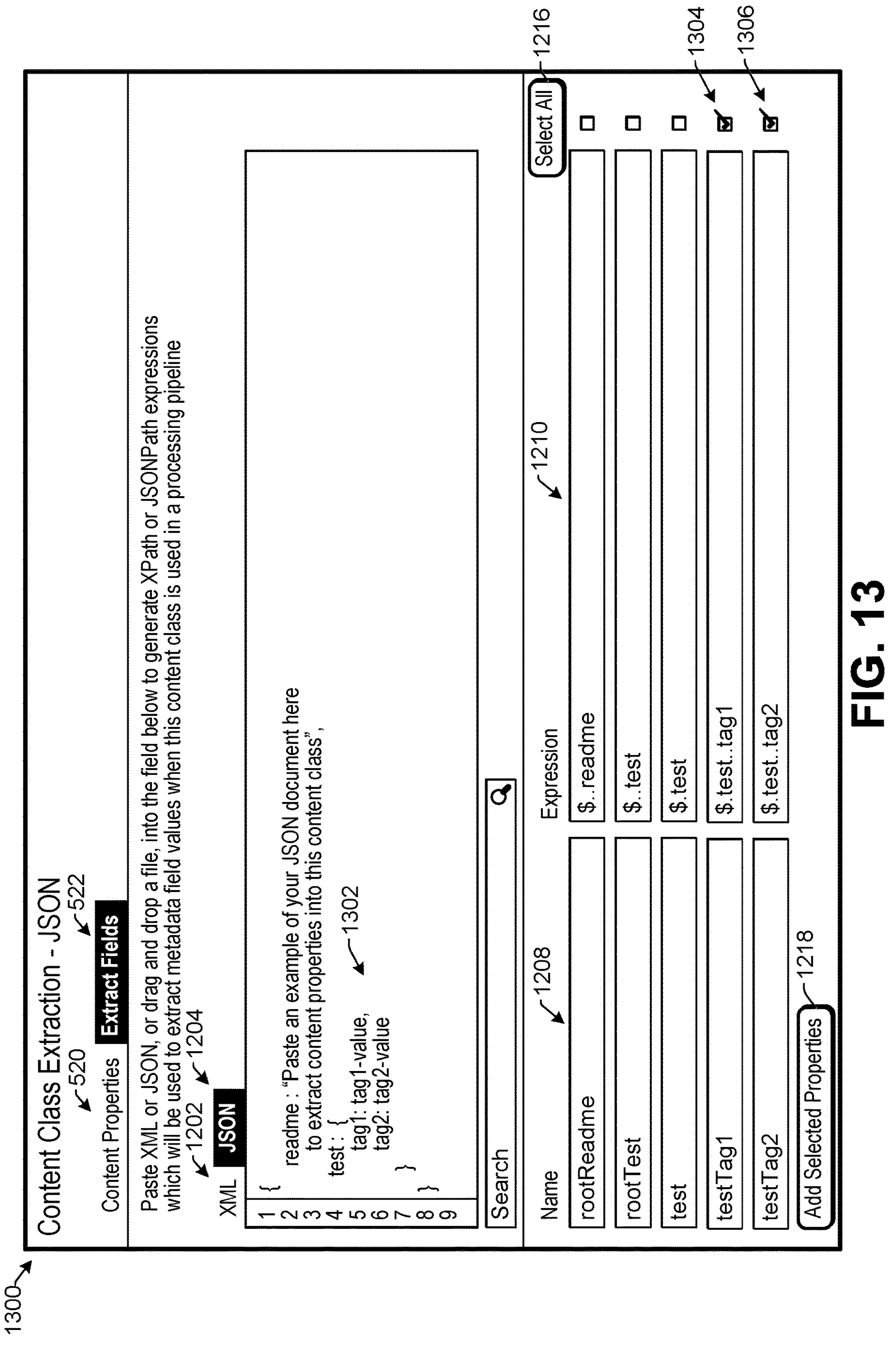

FIG. 13

CONTENT CLASSES FOR OBJECT STORAGE INDEXING SYSTEMS

TECHNICAL FIELD

This disclosure relates to the technical field of indexing and searching object data.

BACKGROUND

Users may store data as objects (e.g., files or other types of content) in object storage systems. Object storage systems may contain a wide variety of structured and unstructured object data. This object data can also include associated metadata that helps describe the content. In addition, various different types of objects may be stored in a wide variety of storage locations, with each storage location having its own idiosyncrasies regarding the metadata associated with the stored data, and regarding requirements for searching for the stored data. Thus, a user may have difficulties searching for particular content across a large number of data sources. Further, with a wide variety of content and associated metadata, it may be difficult to provide a general mechanism that enables indexing of stored content without dedicating a large quantity of storage resources to an index.

SUMMARY

Some implementations use content classes to manage indexing of object data. A content class may include a set of one or more content properties. Each content property may include a name, an expression for extracting data, and an expression type. When object data is received, such as for indexing, the expression type of each content property may be compared with the data type of the received data. Based at least in part on determining that the expression type corresponds to the data type, the system may extract a data value from the received data in accordance with the expression. The system may save the extracted data value to a data structure in association with the name of the content property, and may subsequently use the data value and the name of the content property when creating an index for the object data. Accordingly, some examples herein employ user configurable content classes when indexing object data to identifying specific parts of data to index, rather than merely indexing all the data available to the system.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example of content properties according to some implementations.

FIG. 11 illustrates an example index according to some implementations.

FIG. 13 illustrates the example recommendation user interface according to some implementations.

DESCRIPTION OF THE EMBODIMENTS

Figure 1:
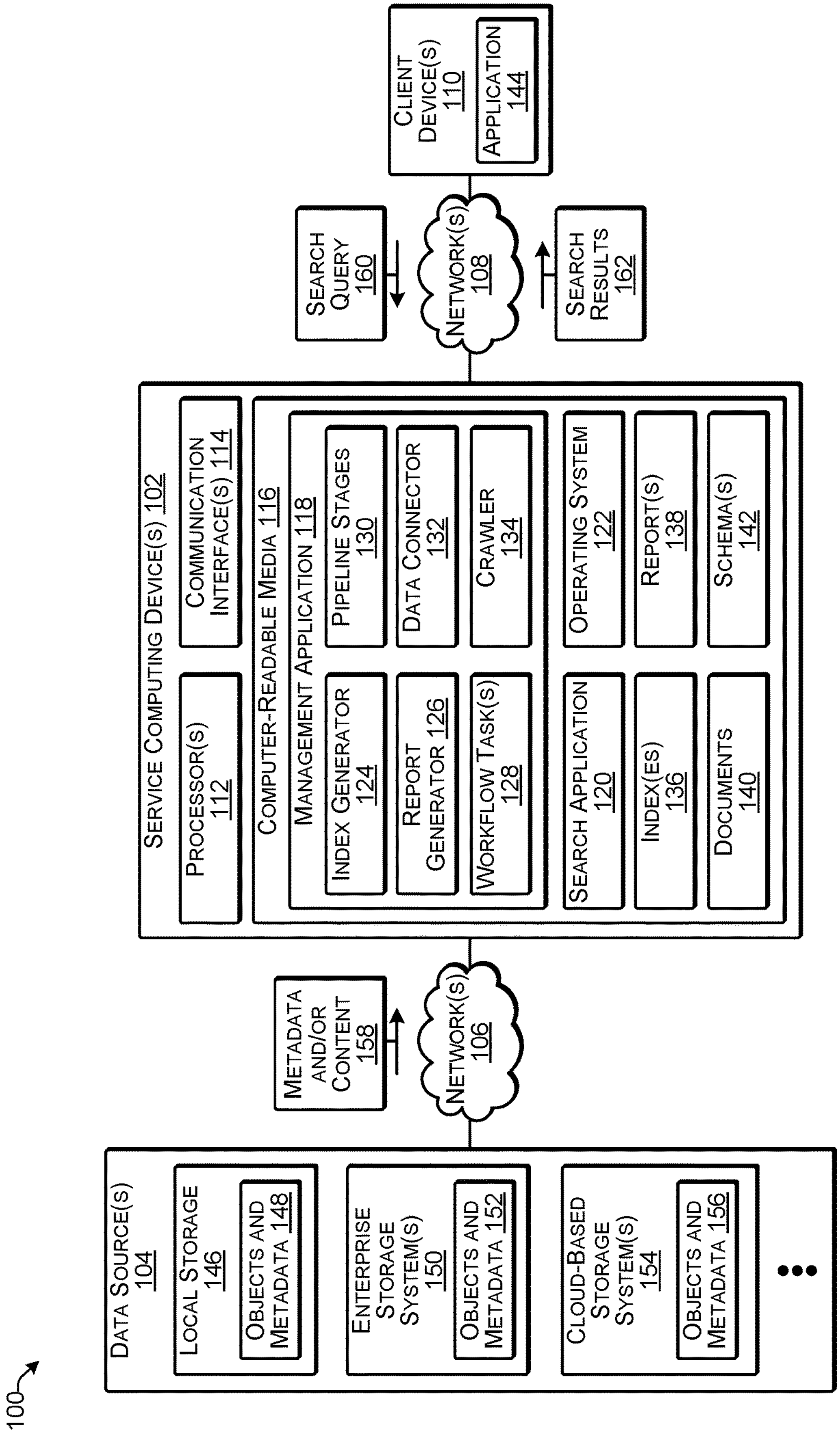
FIG. 1 illustrates an example architecture of a system configured to provide data processing for indexing and searching according to some implementations.

Some implementations herein are directed to techniques and arrangements for accessing object data in any of a plurality of data sources, and determining, changing, and/or enhancing metadata for the data, such as for creating searchable indexes and/or reports for the data and the corresponding metadata. For instance, the data may be maintained at a large variety of storage locations or other data sources, such as local storages, enterprise storages, cloud-based storages, and so forth, which can make searching for data difficult since searching is typically use-case and domain specific. Accordingly, some implementations herein provide for automated metadata enhancement for object data to enable uniform indexing of the object data.

As one example, data processing may be performed on object data to index the data and the corresponding metadata according to one or more index schemas. A user searchable index may be generated for the data that enables different types of unstructured data stored at different data sources to be searched in a uniform manner. Further, some examples may define a blueprint for adding structure to the object data and to the metadata corresponding to the object data. For example, the data may be indexed with added, changed, or otherwise enhanced metadata that makes the data easier to find, regardless of the type of data or the storage location of the data.

Some implementations herein may employ "content classes" for providing structure to the object data. The content classes may act as a filter in some examples, and may each include or refer to a set of user-defined "content properties". Each content class may include a bundle of the content properties, with each content property including a name, an expression, and an expression type. Examples of expression types include XML (Extensible Markup Language), JSON, or a pattern based on a regular expression. JSON is an open standard object notation format originally extended from JAVASCRIPT® that uses human-readable text to transmit data objects. JSON is a common data format used for asynchronous browser/server communications. Additionally, in computer science, a "regular expression" is a sequence of characters that define a search pattern, which may be used in pattern matching with strings. Each character in a regular expression (i.e., each character in the string describing a pattern) is understood to be either a metacharacter (with a special meaning), or a regular character (with a literal meaning). Together, metacharacters and regular characters can be used to identify textual material of a given pattern.

Each content property herein may enable extraction of specific metadata fields from objects (e.g., custom metadata XML tags, fields in a JSON object, and/or regular expression patterns). Further, the content properties enable metadata fields to be indexed efficiently under a user-defined name with strong typing, and the metadata field may be multi-dimensionally queryable via a user interface and/or a programmatic query interface. In the examples herein, XML code and JSON code may be referred to as structured text, while other types of text, text documents, text data, or the like may be referred to as unstructured text, and may be subject to regular expression pattern matching in some cases.

The system herein may include one or more storages maintaining objects that include content data and associated metadata. The metadata may be used to construct a plurality of user-defined content properties. Specific metadata fields may be extracted from the objects by referring to a user-defined content property name of a particular content property. The content properties are organized into user-defined content classes. Each content class may group a set of content properties into a named category under a user-defined content class name. The system may index the content properties of the content classes to create a searchable inverted index. The content properties that are indexed may be identified by the content property names Further, the system may provide software pipeline processing of data and associated metadata to provide enhanced metadata and associated content properties for the data and the metadata. The pipelines may include a plurality of defined processing stages for determining or enhancing metadata. Further, a pipeline may be associated with other pipelines such that the output of one pipeline may serve as the input of another pipeline. When processing a piece of data, each pipeline may generate and/or process a document data structure that represents a subject data object and the metadata associated with the object. The content classes may be used within the pipelines according to built-in content class stages to extract and/or enhance metadata from the input object data and associated metadata.

One or more workflow tasks may be set up for performing the data processing on the data and metadata. Each workflow task may be configured to access a data source and may include a pipeline for processing the data objects and associated metadata stored at the data source. Because specific applications typically generate metadata with the same or similar formats, the content classes herein may be used to define, package, and manage these formats across an object storage ecosystem. Accordingly, the use of content classes can eliminate the definition of duplicate sets of content properties across workflow tasks, which can reduce the overall size of the indexes generated by the system. Further, each workflow task can utilize the content classes to obtain a desired indexing behavior for an associated data connector that connects the workflow task to a data source.

For discussion purposes, some example implementations are described in the environment of one or more computing devices in communication with one or more storage locations and one or more client devices. However, implementations herein are not limited to the particular examples provided, and may be extended to other types of computing systems, other types of storage environments, other system architectures, and so forth, as will be apparent to those of skill in the art in light of the disclosure herein.

FIG. 1 illustrates an example architecture of a system 100 configured for processing data objects and associated metadata according to some implementations. The system 100 includes a least one service computing device 102 that is able to communicate with, or is otherwise coupled to, one or more data sources 104, such as through one or more networks 106. Further, the service computing device 102 may be able to communicate over one or more networks 108 with one or more client computing devices 110, such as user devices or other devices that may access the service computing device 102.

In some examples, the service computing device 102 may include one or more servers or other types of computing devices that may be embodied in any number of ways. For instance, in the case of a server, the modules, other functional components, and at least a portion of data storage may be implemented on at least one server, such as in a cluster of servers, a server farm or data center, a cloud-hosted computing service, and so forth, although other computer architectures may additionally or alternatively be used. In the illustrated example, the service computing device 102 includes, or may have associated therewith, one or more processors 112, one or more communication interfaces 114, and one or more computer-readable media 116.

Each processor 112 may be a single processing unit or a number of processing units, and may include single or multiple computing units or multiple processing cores. The processor(s) 112 can be implemented as one or more central processing units, microprocessors, microcomputers, microcontrollers, digital signal processors, state machines, logic circuitries, and/or any devices that manipulate signals based on operational instructions. For instance, the processor(s) 112 may be one or more hardware processors and/or logic circuits of any suitable type specifically programmed or configured to execute the algorithms and processes described herein. The processor(s) 112 can be configured to fetch and execute computer-readable instructions stored in the computer-readable media 116, which can program the processor(s) 112 to perform the functions described herein.

The computer-readable media 116 may include volatile and nonvolatile memory and/or removable and non-removable media implemented in any type of technology for storage of information such as computer-readable instructions, data structures, program modules, or other data. For example, the computer-readable media 116 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 116 may be a tangible non-transitory medium to the extent that, when mentioned, non-transitory computer-readable media exclude media such as energy, carrier signals, electromagnetic waves, and/or signals per se. In some cases, the computer-readable media 116 may be at the same location as the service computing device 102, while in other examples, the computer-readable media 116 may be partially remote from the service computing device 102.

The computer-readable media 116 may be used to store any number of functional components that are executable by the processor(s) 112. In many implementations, these functional components comprise instructions or programs that are executable by the processor(s) 112 and that, when executed, specifically program the processor(s) 112 to perform the actions attributed herein to the service computing device 102. Functional components stored in the computer-readable media 116 may include a management application 118, a search application 120, and an operating system (OS) 122. The management application 118 may include a number of functional components for performing various data processing tasks, including an index generator 124, a report generator 126, one or more workflow tasks 128, a plurality of pipeline stages 130, one or more data connectors 132, and one or more crawlers 134, each of which may include one or more computer programs, applications, executable code, computer-readable instructions, or portions thereof. For example, the management application 118 may be executable to generate one or more indexes 136 and/or reports 138 from data maintained at the data sources 104. The search application 120 may provide the one or more client devices with access to the indexes 136, such as for providing search services.

Additionally, the operating system 122 may control and manage various functions of the service computing device 102. Depending on the operating system used, additional components or modules may be employed for running the software herein. As one example, a DOCKER® engine (not shown in FIG. 1) available from Docker, Inc., of San Francisco, Calif., USA, may be executed by the operating system 122 to provide a plurality of software containers for running the various modules and functional components described herein. As another example, a plurality of virtual machines (not shown in FIG. 1) may be employed for running the various modules and functional components described herein. As still another example, multiple physical service computing devices 102 may run some or all of the various modules and functional components described herein. In some cases, the functional components may be stored in a storage portion of the computer-readable media 116, loaded into a local memory portion of the computer-readable media 116, and executed by the one or more processors 112. Numerous other software and/or hardware configurations will be apparent to those of skill in the art having the benefit of the disclosure herein.

In addition, the computer-readable media 116 may store data and data structures used for performing the functions and services described herein. For example, the computer-readable media 116 may store the one or more indexes 136, one or more reports 138, documents 140, and schemas 142. For example, the management application 118 may generate the one or more indexes 136 based on the one or more schemas 142, by processing documents 140, which are data structure representations of the data maintained in the data sources 104. The management application 118 may further use the documents 140 to generate the one or more reports 138 about the data maintained in the data sources 104. The service computing device 102 may also include or maintain other functional components and data, which may include programs, drivers, etc., and other data used or generated by the functional components. Further, the service computing device 102 may include many other logical, programmatic, and physical components, of which those described above are merely examples that are related to the discussion herein.

The communication interface(s) 114 may include one or more interfaces and hardware components for enabling communication with various other devices, such as over the network(s) 106 and 108. Thus, the communication interfaces 114 may include, or may couple to, one or more ports that provide connection to the network(s) 106 for communicating with the storage system 104, and one or more ports that provide connection to the network(s) 108 for communication with the client devices 110. For example, the communication interface(s) 114 may enable communication through one or more of a LAN (local area network), WAN (wide area network), the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Each client device 110 may be any suitable type of computing device such as a desktop, workstation, server, laptop, tablet computing device, mobile device, smart phone, wearable device, or any other type of computing device able to send data over a network. In some cases, the client device 110 may include hardware configurations similar to that described for the service computing device 102, but with different data and functional components to enable them to perform the various functions discussed herein. In some cases, a user may be associated with a respective client device 110, such as through a user account, user login credentials, or the like. In some examples, the client device 110 may access the service computing device 102 through an application 144, such as a browser or other application executed on the client device 110. For instance, the application 144 may enable access to the search application 120, such a through a browser graphic user interface, a command line interface, or via an application programming interface (API). Furthermore, the client device 110 may be able to communicate with the service computing device 102 through the one or more networks 108 or through any other suitable type of communication connection. Numerous other variations will be apparent to those of skill in the art having the benefit of the disclosure herein.

The one or more networks 106 and 108 may include any suitable network, including a wide area network, such as the Internet; a local area network, such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 and 108 may include both wired and/or wireless communication technologies. Components used for such communications can depend at least in part upon the type of network, the environment selected, or both. Protocols for communicating over such networks are well known and will not be discussed herein in detail. Accordingly, the service computing device 102 and client device 110 are able to communicate over the one or more networks 108 using wired or wireless connections, and combinations thereof.

The data sources 104 may include any type of data storage including storage devices, storage systems, storage networks, cloud-based storage, or any other type of storage capable of maintaining data readable by a computing device. Although not illustrated herein for clarity, in general, a storage system may include one or more storage computing devices, which may include one or more servers or any other suitable computing device, such as any of the examples discussed above with respect to the service computing device 102. The storage computing device(s) may each include one or more processors, one or more computer-readable media, and one or more communication interfaces. For example, the processors may correspond to any of the examples discussed above with respect to the processors, the computer-readable media may correspond to any of the examples discussed above with respect to the computer-readable media, and the communication interfaces may correspond to any of the examples discussed above with respect to the communication interfaces 114.

In addition, the computer-readable media at the storage system may include one or more storage modules as functional components executed by the one or more processors for managing the storage of data on a storage included in the storage system. The storage may include one or more controllers associated with the storage for storing data on one or more arrays of storage devices. For instance, the controller may control one or more arrays, such as for configuring the arrays in a RAID configuration, or the like, and/or for presenting logical units based on the storage devices to the storage module, and for managing data stored on the underlying physical storage devices. The storage devices may be any type of storage device, such as hard disk drives, solid state devices, optical devices, magnetic tape, and so forth. In some examples, the one or more arrays may include thin-provisioning capability configured to provide on-demand storage capacity, may include failover protection, automated replication, backup, archiving, or the like.

In the illustrated example, the data sources 104 may include a local storage 146 maintaining objects and metadata 148. For example, the local storage 146 may be connected to the service computing device 102 through a direct connection, a LAN, or the like. In addition, the data sources 104 may include one or more enterprise storage systems 150 maintaining objects and metadata 152. For example, the enterprise storage systems may be connected to the service computing device 102 through a LAN or a WAN, and in some examples may be a private and/or proprietary storage, such as in the case of a corporate intranet or the like. In addition, the data sources 104 may include one or more cloud-based storage systems 154 maintaining objects and metadata 156. For example, the cloud-based storage system 154 may be a public or private storage system accessible over the Internet or other WAN, and typically may be implemented on equipment maintained by a commercial entity or the like. Furthermore, while several example data sources are illustrated in FIG. 1, numerous other types of data sources may be used by the implementations herein for identifying and indexing data stored on the data sources. Accordingly, implementations herein are not limited to any particular type of data source.

In the example of FIG. 1, the management application 118 may be executed to obtain metadata and/or object content 158 from one or more of the data sources 104, and may perform one or more workflow tasks 128 to determine and/or enhance metadata to associate with the stored objects. The index generator 124 may generate one or more indexes 136 based on the metadata and/or object content 158 obtained from the data sources 104. A user at a client device 110 may submit a search query 160 to the search application 120, as discussed above. In response, the search application 120 may access the one or more indexes 136 to locate data relevant to the search query 160. The search application 120 may return search results 162 to the client device 110. The client device 110 may then access the desired data, such as by sending a request to a computing device that manages access to the data source maintaining the desired data. For instance, the search results 162 may include a uniform resource identifier (URI) such as a uniform resource locator (URL) or other link or information that enables the application 144 on the client device 110 to access the desired data.

Figure 2:
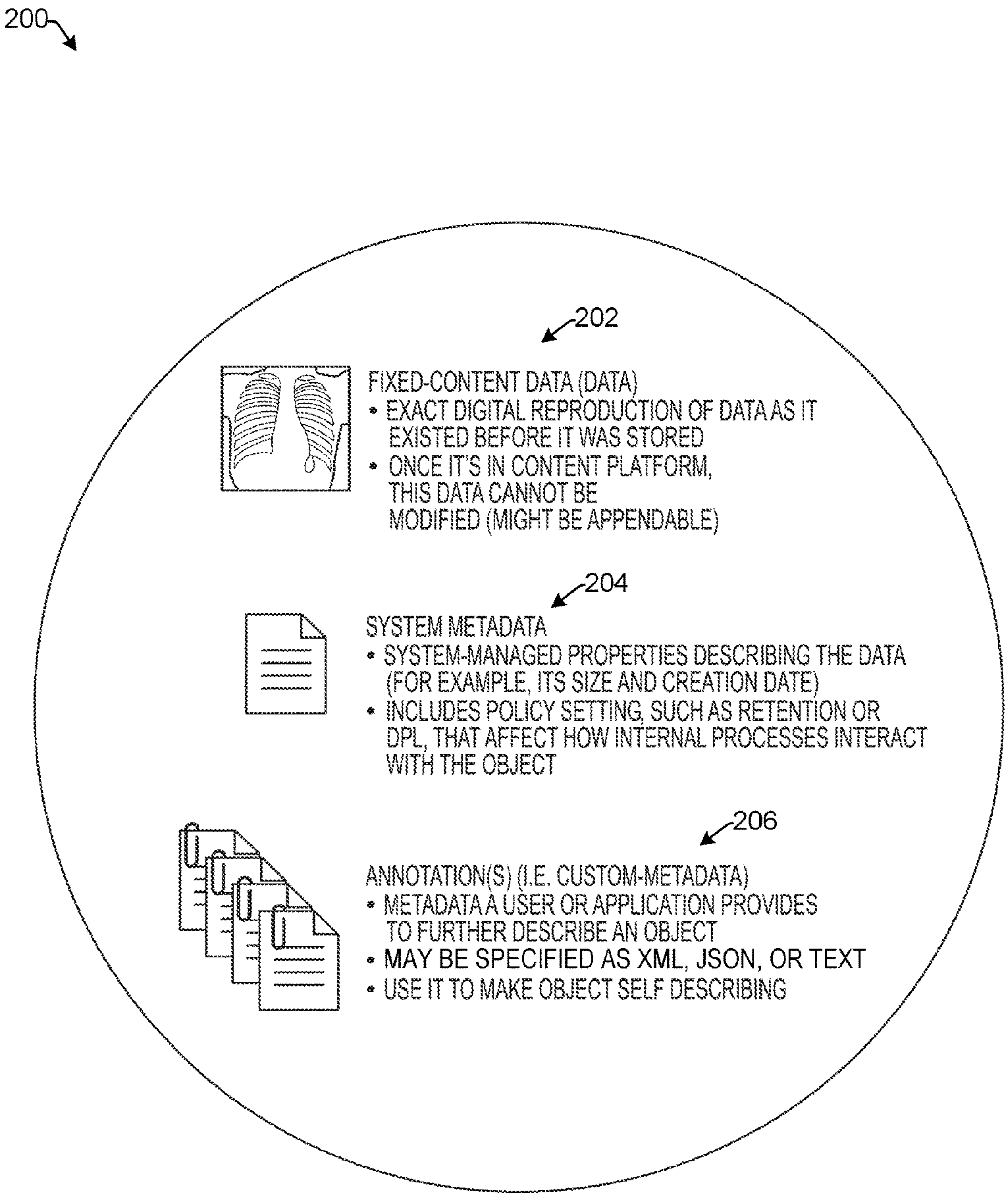
FIG. 2 illustrates an example of a data object having system metadata and custom metadata according to some implementations.

FIG. 2 illustrates an example of a data object 200 and corresponding metadata according to some implementations. In general, an object storage system enables metadata to be attached to, or otherwise associated with, corresponding data objects stored in the storages. Each storage may employ different techniques for naming or structuring individual elements to provide an implied organization. Some examples herein provide individual collections of metadata or custom metadata (also referred to as annotations) that allow for differing layout/formats for the metadata. The usage of content in object storage systems may be centered around utilizing network protocols for creation, reading, updating, and deleting objects. While many protocols may be used, some examples herein use the Hypertext Transfer Protocol (HTTP) and, in some cases, a software architecture referred to as Representational State Transfer (REST) that is common with many web-based client/server implementations and typical with cloud based storage.

In the example of FIG. 2, the object 200 has three main parts: fixed-content data 202, system metadata 204, and user-defined or custom metadata, referred to as annotations 206. The fixed-content data 202 may be an exact digital reproduction of data content as the data content existed before the data content was stored. After the data is stored in the object system, the data typically is not modified, but may be replaced by updated data and/or deleted. The system metadata 204 includes system-managed properties describing the data, such as the size of the content data 202, creation date, and various other information about the data. The system metadata 204 typically includes policy settings, such as retention or DPL (data protection level), that affect how internal processes interact with the object 200. The object 200 may further include annotations 206, which may be custom metadata provided by a user or application to further describe the object 202. In the examples herein, the custom metadata 206 may be specified using XML, JSON, or regular expression patterns (e.g., binary annotations or other unstructured text), and may be used to make an object self-describing.

Figure 3:
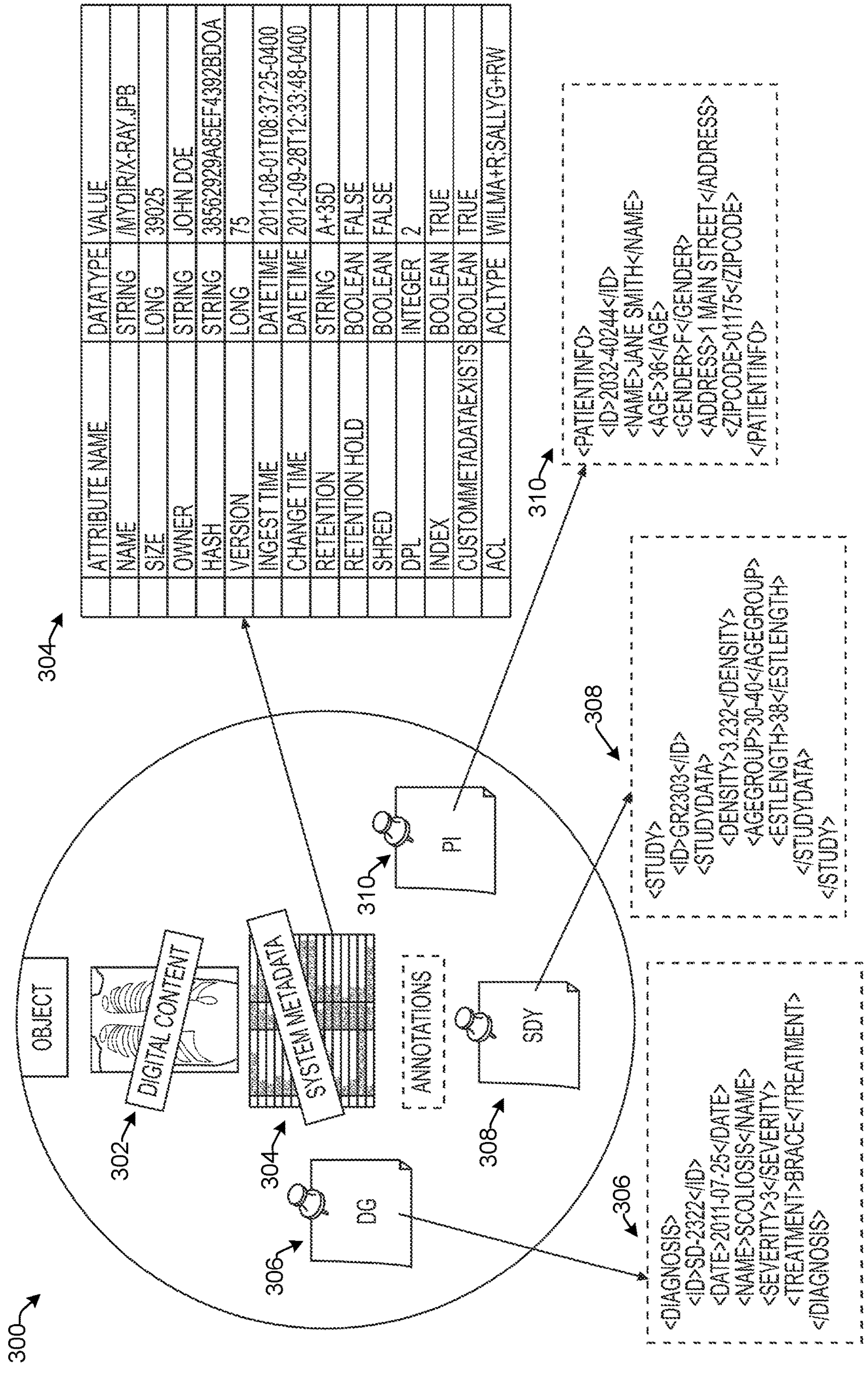
FIG. 3 illustrates an example of a data object having system metadata and custom metadata according to some implementations.

FIG. 3 illustrates an example of an object 300 having system metadata and multiple named collections of user-defined custom metadata according to some implementations. Accordingly, the object 300 includes the object content 302 and system metadata 304. As mentioned above, the system metadata 304 may often include the same or similar attributes for each object stored in the same storage system, such as name, size, owner, ingest time, and so forth.

In addition, the object 300 in this example has custom metadata annotations that are named collections of custom metadata associated with the object 300. The custom metadata collections in this example include a diagnosis 306, a study 308, and patient information 310. Accordingly, some implementations herein enable multiple named collections or elements of user-defined or otherwise custom metadata. Each named collection 306, 308, or 310 of the multiple named collections 306, 308, 310 associated with the object 300 may be separately addressable by a single request which includes an addressable unit of the object 300 and qualifying language specifying the particular named collection 306, 308, or 310. While each named collection 306, 308, 310 is separately addressable, it is also possible to have an implementation whereby multiple named collections can be accessed at the same time by a single request. As one example, a user or application may employ HTTP/REST requests to access some or all of the custom metadata collections 306, 308, or 310. The custom metadata may be generated by a user, by a separate program, such as based on analysis of the object content 302, or the like. Another example of custom metadata of an object (not shown) is metadata that links or associates a first object with a second object.

The object 300 may include an object-level access control list (ACL) (shown as the last line in the system metadata 304). In addition, each custom metadata annotation may include its own annotation-level ACL (not shown), so that different custom metadata annotations 306, 308, 310 may have different ACLs that may be different from the object-level ACL. The annotation-level ACL of a custom metadata annotation specifies which requester can have access to that annotation.

Once the object 300 exists, the custom metadata annotations 306, 308, or 310 can be added, updated, or deleted utilizing HTTP REST requests. This is performed by specifying, via a controller of an object system, a URL to the existing object 300, requesting a PUT operation, and supplying the content of the custom metadata annotation. The request URL not only provides the location of the object 300, but also directs the object storage controller to perform the specified operation on the named annotation. The format of the custom metadata annotation (e.g., XML, JSON, binary, etc.) might not be dictated by the object storage system; in the illustrated example, the custom metadata annotations are represented in XML format.

To retrieve a list of all custom metadata annotations for a given object, there are at several mechanisms that can be utilized. A first mechanism is performing an HTTP HEAD or GET request against the object; the response may include a simple name/size list. For full information about the custom metadata annotations associated with an object, an HTTP GET request can be performed against the object providing an alternative directive in the URL request and the specification of how to present the list. In some examples, an HTTP/REST API may be employed for obtaining the custom metadata annotations associated with a particular object, as discussed additionally below, but other techniques, such as a web-based GUI interface may also be used. Further, system herein may provide a REST API to enable users to interact with the system.

FIG. 4 illustrates an example of content property expressions that may be used to construct one or more content classes according to some implementations. As mentioned above, each content class includes one or more content properties. Each content property includes a name 402, an expression type 404, and an expression 406. The name 402 may be a human-meaningful name for the content property, such as may be used for a search query. The expression type 404 distinguishes how the content is evaluated according to the expression at runtime. Further, the expression 406 identifies how the value of a content property is extracted from the custom metadata content. For example, different expression syntax is used depending on the expression type 404 for that content property. The expression type 404 allows data content to be interpreted by the configured content property in a variety of ways. In some examples herein, content property expressions 406 may be generated for the following expression types 404:

XML: XPath (XML Path Language) expressions allow for extracting information from XML into standardized fields. XPath is a syntax for defining the parts of an XML document. For example, XPath may provide a compact notation for defining a path to a particular portion of an XML document. XPath is defined by the World Wide Web Consortium (W3C).

JSON: JSONPath (JSON Path Language) expressions allow for extraction information from JSON into standardized fields. JSONPath is to JSON what XPath is to XML, i.e., a simple way to extract parts of a given JSON document using a compact syntax.

Pattern: Regular expressions allow for extracting information from raw content into standardized fields. The pattern expressions may be common syntax patterns used for recognizing binary or other types of expressions of information.

Accordingly, as illustrated in FIG. 4, content properties 408, 410, and 412 have XML expression types that are expressed using XPath syntax. Further, content property 414 has a JSON expression type that is expressed using JSONPath syntax. Content properties 416 and 418 have pattern expression types that are expressed using common syntax for an email address and social security number, respectively. In addition, the content properties are not limited to name 402, expression type 404, and expression 406, but may include additional information for each content property, such as field type (e.g., "string", "tokenized text", "Boolean", "integer", "float", etc.) or other types of information.

Figure 5:
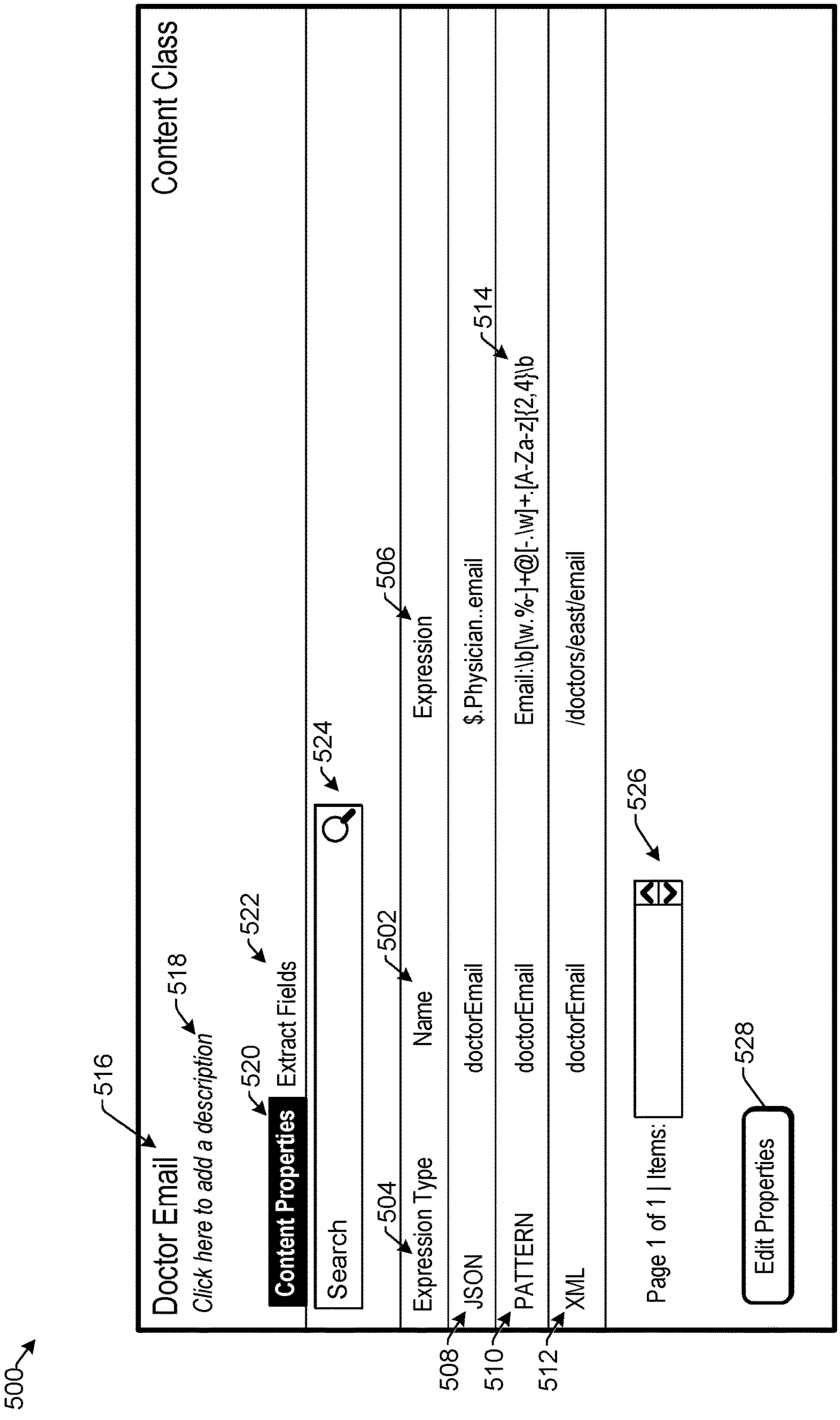
FIG. 5 illustrates an example content class according to some implementations.

FIG. 5 illustrates an example of a user interface 500 for defining a content class according to some implementations. As mentioned above, content classes may be used to add structure to the unstructured content of an object and the metadata associated with the object. Each content class may include a set of user-defined content properties. Each content property provides the ability to extract a specific metadata field or other data value from objects, index the extracted data value under a user-defined name, and make that data value multi-dimensionally queryable via a search engine user interface and/or a programmatic query interface. Each content class may group and organize a set of content properties into named categories. Because each content class is named, the user interface and programmatic interface can reference the content classes to simplify the construction of queries on the otherwise unstructured content.

The example user interface 500 illustrated in FIG. 5 includes content property fields for name 502, expression type 504, and expression 506. The name 502 in this example is "doctorEmail", which may be a user specified unique name for the content property, and which is a human-meaningful name that can be used for a search query. The expression type 504 indicates that this content class includes content properties for JSON, as indicated at 508, Pattern, as indicated at 510, and XML, as indicated at 512. The expressions 506 indicate how the value corresponding to each content property is extracted from the corresponding custom metadata content. For example, when the custom metadata is in XML format, the expression used is in XPath syntax, and expresses a path for locating the corresponding value in the metadata content. Thus, in this example, the email address of the doctor referred to in the custom email is identified within an email tag in the XML document of the custom metadata. Similarly, in the case of content property 508, a JSONPath expression provides the location of the doctor's email, while in content property 510, the doctor's email is identified in custom metadata based on matching a regular expression pattern 514 corresponding to the format of an email address.

In this example, the content class is named "Doctor Email", as indicated at 516, and the user interface 500 further includes the ability to add a plain-language description 518 to the content class, if desired. Further, the user interface 500 shows that the content properties tab 520 is currently selected and that the user also has an ability to select an extract fields tab 522 which may be used to determine recommended content property expressions for selected types of custom metadata, as discussed additionally below. Furthermore, the user interface includes a search field 524 to enable the user to search for content properties, a results field 526 to enable the user to view the results of research, and an edit property button 528 that the user may select to edit the properties of a particular content property.

As one example, suppose that an object storage system stores a large number of medical images as a plurality of data objects. Furthermore, suppose that each of these images has corresponding custom metadata (XML-based in this example), which provides basic contact information for one or more doctors that have examined the image and the patient with whom the image is associated. An example of the custom metadata for one of the images is set forth below:

```
<record>
    <doctor>
        <id>12345</id>
        <name>John Smith</name>
        <address>1234 Main Street Boston, MA 02215</address>
    </doctor>
    <patient>
        <id>56789</id>
        <name>John Smith</name>
        <address>567 Lincoln St Waltham, MA 03786</address>
            <dateOfBirth>1/2/1970</dateOfBirth>
    <patient>
</record>
```

Thus, in this example, the doctor is named John Smith and the patient is also named John Smith. A conventional indexing and searching approach may allow users to query for individual keywords and phrases within their custom metadata. Such an approach does not consider the structure of the custom metadata while performing the indexing. Accordingly, in this example, using conventional techniques, a user may not be able to accurately perform a query on the name of the doctor. For example, a query on "John Smith" would return all images examined by Dr. John Smith as well as all images associated with John Smith the patient, including images examined by doctors other than Dr. John Smith. Moreover, it would not be practical to attempt to find objects by using value ranges, such as, e.g., to find all patients of a specific age based on their dates of birth.

Additionally, conventional indexing and searching techniques may employ an all-or-nothing approach to indexing custom metadata content, which provides the system administrators with very little control over the size of the generated indexes. For instance, when enabled, all custom metadata content might be indexed, including information for which the users may not be interested in searching. Thus, conventional indexing techniques can lead to a bloated index size, which has negative implications on storage and memory utilization across the system.

Some implementations herein address these issues through the use of the content classes discussed above. For example, the content classes enable users to specify content properties that are used when indexing custom metadata content. The content properties describe a particular attribute that may be contained in the custom metadata associated with objects, as well as information about the structure of this metadata in the form of an expression (e.g., using XPath, JSONPath, or regular expression pattern syntax). Accordingly, in the example in which there are a large number of medical images, each with custom metadata, an administrator familiar with the structure of the custom metadata may define the following content class including the following content properties:

| NAME | EXPRESSION TYPE | EXPRESSION |
|---|---|---|
| Doctor | XML | /record/doctor/name |
| Patient | XML | /record/patient/name |
| DOB | XML | /record/patient/dateOfBirth |

These content properties may then be used to extract specific values from the content of the custom metadata for the large plurality of images for indexing, as well as for searching. This also enables a user to submit search queries against the defined object properties.

As one example, a search for "Doctor: 'John Smith'" may return only the images examined by Dr. John Smith. Images associated with the patient named John Smith will not be returned by the query unless they were examined by Dr. John Smith. Accordingly, implementations herein enable users to perform focused, structured queries on the custom metadata associated with the objects.

As another example, a search for "DOB:[Jan. 1, 1940 TO Jan. 1, 1980]" may return only the images for patients between born between 1940 and 1980, while excluding images for patients born outside that date range.

Accordingly, the system herein may be configured to index only the values a user considers useful for searching. If the user does not want to index any other values from the object's custom metadata, then the index size is limited to just the three fields per object discussed above, regardless of how large the entire custom metadata is, thus providing significant savings in storage and memory space savings and thereby boosting performance of the system.

Figure 6:
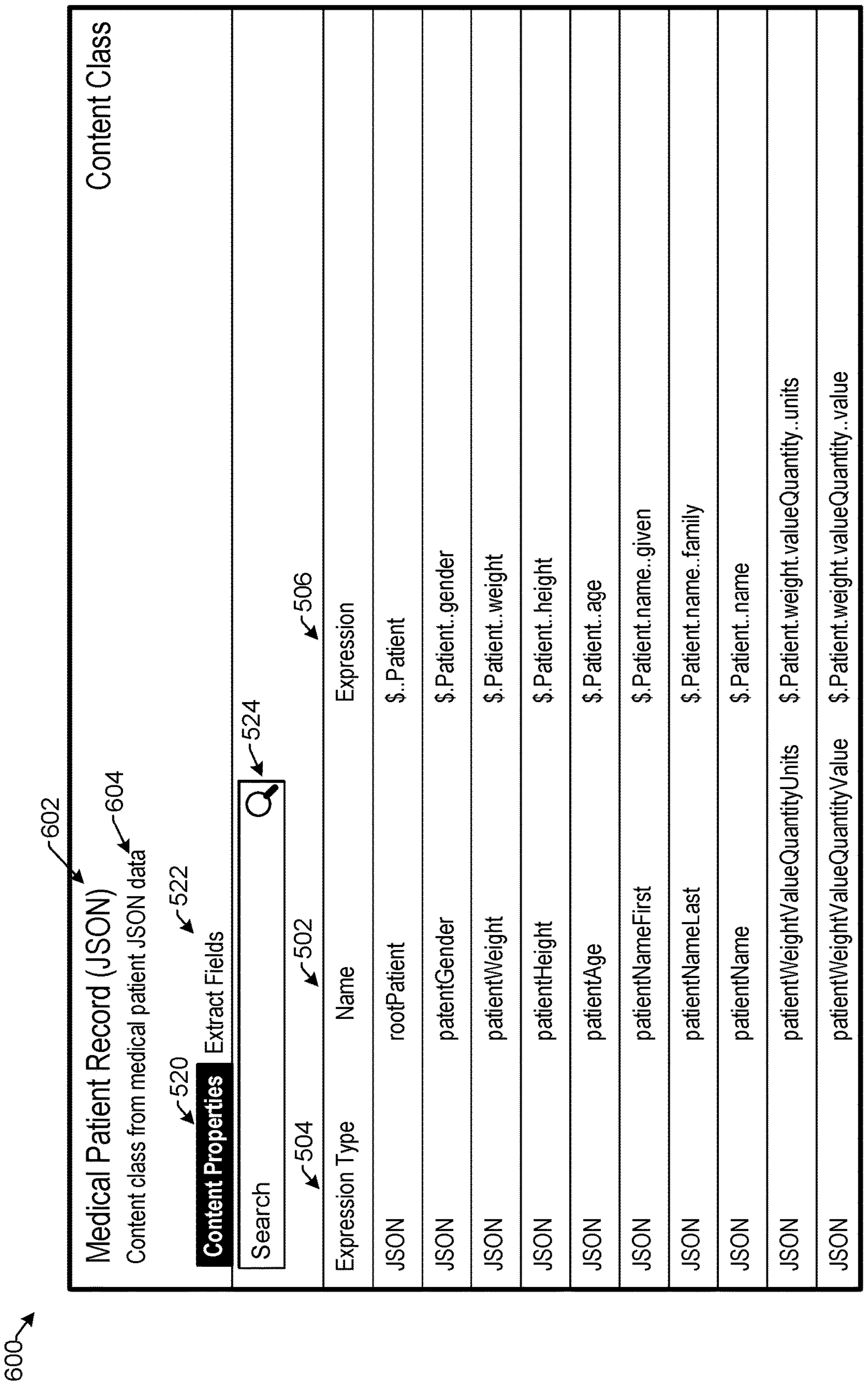
FIG. 6 illustrates an example content class according to some implementations.

FIG. 6 illustrates an example of a user interface 600 for defining a content class according to some implementations. For instance, as mentioned above, metadata values can be extracted from JSON text using JSONPath expressions in a manner similar to extracting XML values from XML metadata using XPath. In some examples, as discussed additionally below, the JSONPath expressions may be recommended from sample JSON metadata text provided by the user. In the example of FIG. 6, the illustrated content class has a title 602 "Medical Patient Record (JSON)", and further includes a brief description 600 for indicating that the content class is from medical patient Jason data. In this example, the user has configured a plurality of content properties that can be identified by the respective names 502. Accordingly, when the content class illustrated in FIG. 6 is applied to the corresponding custom metadata, the values for the illustrated content properties will be extracted from the metadata and provided to the index generator for indexing.

In addition, as another example, regular expression patterns may be defined as a content property expression. For instance, a pattern may be a regular expression that can be made to match arbitrary text. This technique may be particularly useful for adding structure to unstructured data. For example, if the content is not XML or JSON, patterns may be used to parse out indexable values from content in a manner similar to those discussed above for XML and JSON. As one example, consider the following snippet from the content of a text file object having a file name "Doctors.txt":

John Smith
john_smith@company.com
1234 Main Street Boston, Mass. 02215

Furthermore, suppose that the user wants to extract the email address out of this unstructured text file, and other similar unstructured text files. To accomplish this, the user may add the following content property to a content class:

| NAME | EXPRESSION TYPE | EXPRESSION |
|---|---|---|
| Email | Pattern | \b[\w.%-]+@[-.\w]+.[A-Za-z]{2,4}\b |

When executed, this content property will extract the email address "john_smith@company.com" and the index generator may apply this to the "Email" field of an index. Accordingly, the Pattern expression type allows users to harness unstructured text data for data indexing and search solutions.

Additionally, the indexes herein may be efficiently "de-duped" to avoid creation of duplicate entries in the index. This de-duplication effect may even take place across workflow tasks and across different data sources, such as in the case in which the same values are expressed differently in custom metadata formats. For example, consider a situation in which the same custom metadata is formatted differently in different data sources. Thus, in one data sources, suppose that the custom metadata for doctor name is formatted as follows:

```
<doctor>
    <name>John Smith</name>
</doctor>
```

Further, supposed that in a different data source, the custom metadata for doctor name is formatted as follows:

```
{
    "physician": {
        "fullname": "John Smith"
    }
}
```

In such a situation, the administrator setting up a content class for extracting doctor names can use content properties to direct both values to the same index field:

| NAME | EXPRESSION TYPE | EXPRESSION | FIELD TYPE |
|---|---|---|---|
| Doctor | XML | /doctor/name | String |
| Doctor | JSON | $.physician . . . fullname | String |

Thus, in this example, the physician name associated in the JSON metadata is associated with the Name "Doctor" even though the term "doctor" does not appear in the metadata. This allows for uniform searches and reduces the size of the index generated from the metadata. For instance, a query for Doctor:"John Smith" will find the objects associated with either custom metadata format, and allows for significant storage and memory savings, thereby boosting performance of the system. As shown, this type of uniformity also can be used across expression types. For example, a Pattern extracting a phone number to a field "Phone" and a JSON expression including a phone number that extracts to a field "Phone" may provide a uniform search for phone numbers associated with objects and/or metadata.

Additionally, in the example content properties set forth above, a field type is provided. In this example, the field type is "string", indicating that the extracted values are strings. This field type information may be used by the index generator when determining storage space to reserve for the index, index configuration, or the like.

Figure 7:
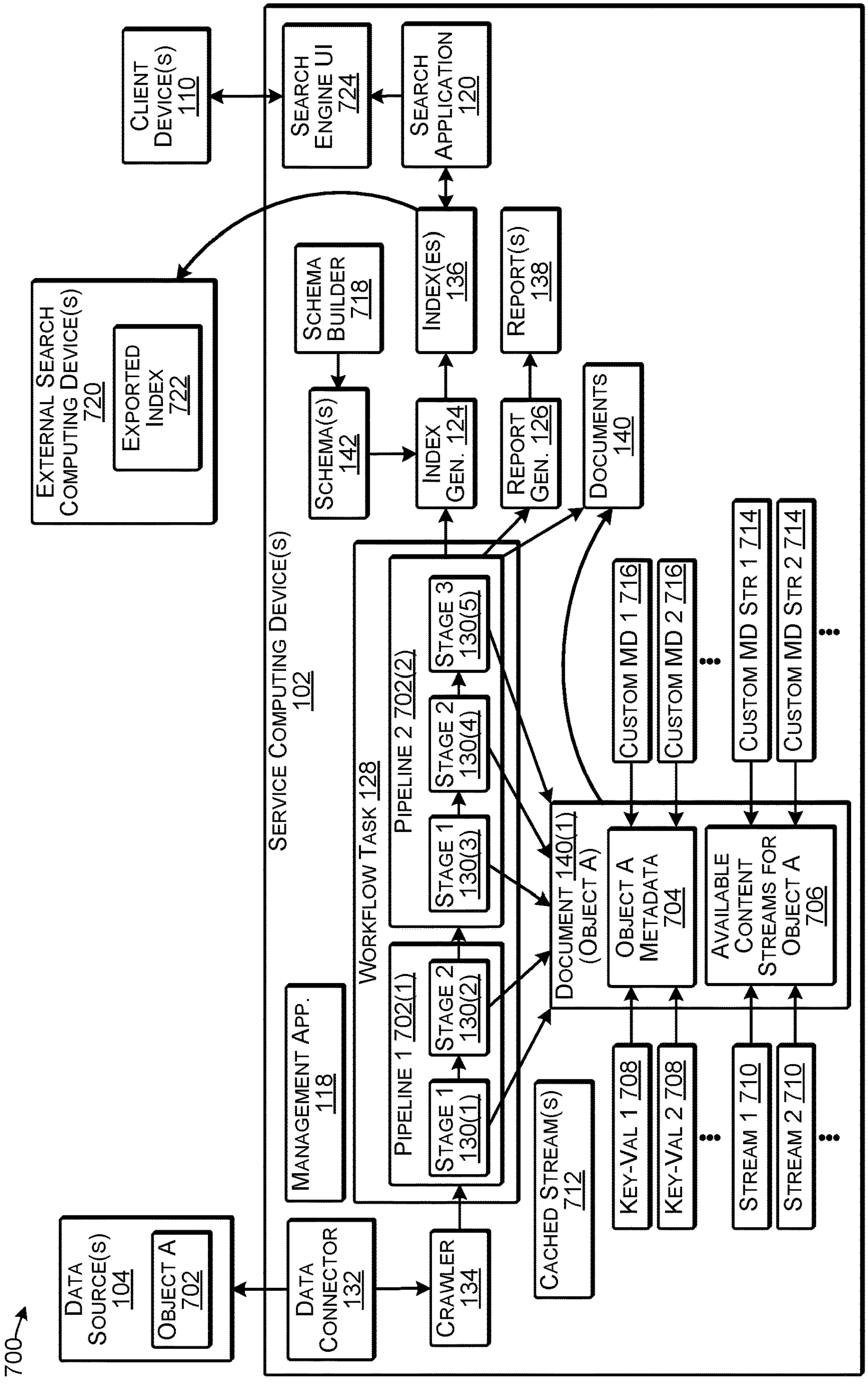
FIG. 7 illustrates an example workflow task including pipeline processing according to some implementations.

FIG. 7 illustrates an example 700 of processing data from a data source according to some implementations. In this example, a workflow task 128 has been constructed for processing data from one or more of the data sources 104. For example, the workflow task 128 may be a series of instructions and pipeline stages 130 assembled by a user (e.g., an administrator) and executed by the service computing device 102 for generating an index 136 according to a desired index schema 142. As mentioned above, searching for data across a large variety of storage domains and other data sources 104 can be use-case and domain specific, which can make searching for data difficult and time consuming. As one example, such as in the case of medical data, the data sources 104 may maintain many different types of files or other objects, each of which may be customizable to a plurality of different customers' use cases. In addition, the data objects may sometimes be configured differently for storage at different storage domains. For instance, a magnetic resonance imaging (MRI) machine may generate images and associated metadata in a number of different formats that are customized for different customers. Accordingly, implementations herein may provide a data content processing workflow that can be trained to identify accessed data and generate appropriate metadata for the data to enable indexing of the data and the associated metadata, and thereby to provide a uniform search capability to users of the indexing and searching system herein.

The workflow task 128 may be configured to include one or more pipelines 702, with each pipeline 702 including a plurality of stages 130. In the illustrated example, the workflow task 128 includes a first pipeline 702(1) and a second pipeline 702(2). The first pipeline 702 includes a first stage 130(1) and a second stage 130(2). Similarly, the second pipeline includes a first stage 130(3), a second stage 130(4), and a third stage 130(5). The workflow task 128 may be configured according to how the data is to be processed for determining and/or enhancing metadata for the data, such as for generating an index 136 for the data and/or a report 138 about the data. A user of the system may create a custom pipeline for a desired workflow task 128 for a selected data source 104, and/or may assemble one or more pre-created pipelines to perform the desired workflow task 128. In the illustrated example, suppose the first pipeline 702(1) performs two desired functions and the second pipeline 702(2) performs three additional functions. Of these pipelines 702, either may be provided with the management application 118 or may be custom made by a user.

The workflow task 128 may be configured to receive data from one or more data sources 104, and process the data through the content processing pipelines 702(1) and 702(2). Each pipeline 702 may include a plurality of the content processing stages 130 that perform different tasks and that may be executed in a prescribed sequence, such that the output of an earlier processing stage, e.g., 130(1), may serve, at least in part, as the input of a latter processing stage, e.g., 130(2). In some examples, a software development kit (SDK) (not shown in FIG. 7) may provide a graphic user interface to enable creation of custom pipelines for processing the data, at least in part, according to the characteristics of the data. For example, the first stage 130(1) of the first pipeline 702(1) may perform detection of the type of content of the data (e.g., MIME-type detection), the second stage 130(2) may perform metadata extraction, the first stage 130(3) of the second pipeline 702(2) may perform renaming of metadata, and so forth.

Some or all of the data sources 104 may be registered as inputs into particular workflow tasks 128. The workflow tasks 128 for various data sources 104, various types of data, etc., may be configured to cause the metadata for the data to appear consistent in the index 136 regardless of the data source 104 from which the data is drawn. Accordingly, when a user searches the index 136, the user is able to find the desired data regardless of the metadata that was initially used with the data. As one example, when referring to a doctor, some metadata may use the term "doctor", some may use the term "physician", some "primary care provider", and some other terms. Accordingly, someone searching for a doctor may not locate content stored for "physician", "primary care provider", etc., and, therefore, may miss locating important information. The workflow tasks 128 herein may normalize the data to associate a uniform metadata term, such as "doctor", with all the relevant data, such as discussed above with respect to FIGS. 5 and 6.

The data connector 132 may be plugin or other suitable code or program that is configured to communicate with one or more of the data sources 104. For instance, a first data connector may be configured to communicate with a particular proprietary storage system, while a second data connector may be configured to communicate with a particular cloud storage system. Each data connector 132 may be registered with the system to enable the system to communicate with the one or more data sources 104 for which the data connector 132 is configured. In some cases, the SDK may enable configuration of custom data connectors for various different data sources 104. For instance, the data connector 132 may include a connection string, may provide login information, may provide access credentials, or the like, when connecting to a data source 104. Further, in some cases, the data connector 132 may employ one or more APIs to communicate with software, such as storage management module, at a particular data source 104. As one example, as discussed above, the system may utilize a representational state transfer (REST) API to communicate with a data source 104 or other suitable API.

A crawler 134 may use the data connection formed by the data connector 132 to crawl the data at the data source 104. Any of various known crawling techniques may be used depending on the configuration of the selected data source 104 and the data stored thereon. For example, the crawler 134 may be implemented with efficiencies, such as being configured to skip over data that has already been crawled and that has not been changed since the last time the data was crawled.

The workflow task 128 may be executed by service computing device 102 to pull in information about the data through the crawler 134. For each object, such as a file or other data object at a data source, the workflow task 128 builds a representation of the object referred to as a document 140. Each document 140 may be any suitable type of data structure, and may serve as a virtual representation of the corresponding object. For example, the document 140 may include metadata about the object and information about available content streams for the object.

In this example, suppose that the crawler 134 reaches Object A 702 at the data source 104. A document 140(1) is initially generated through the data connector 132 as a raw document that includes metadata 704 associated with object A as well as information about the information about the content of object A, which may be used for determining one or more available content streams 706 for object A. For instance, the metadata 704 may include a plurality of key-value pairs 708 obtained, e.g., from the system metadata associated with the object A. For example, the metadata may include a URI of a link to the location of the data object A, size of the data object A, name of the data object A, etc. Additionally, as the document 140(1) is processed by the workflow task 128, additional metadata 704 may be added to the document 140(1).

The document 140(1) may further include references to the available content streams, i.e., the content of the object A. In some examples, this content can be streamed (i.e., copied) to a stage 130 in the workflow task 128, such as to enable the stage 130 to perform an analysis or other processing of the content of the object A. For example, suppose that the object A is a text file. The data connector 132 may stream the text of the text file to a particular stage 130 of a pipeline 702, and the stage 130 may recognize each word in the text, such as for indexing the text content of the text file. Further, some types of objects may have multiple available streams 710, such as video streams, audio streams, text streams, and so forth, and all, some, or none of these streams may be sent to the stages 103, depending on the schema of the index to be generated. After a stream has been read once by a stage 130 of the workflow task 128, the streamed content may be cached locally temporarily at the service computing device 102 as a cached stream 712 in case another stage 130 of the workflow 128 also will use the received object content. For instance, suppose that the second stage 130(2) downloads the text content of an object to determine a number of words in the object. The content of the object may remain cached until processing of the object is complete so that the content does not have to be downloaded a second time if access to the text content is required by another stage 130 in the workflow task 128.

In addition, in some cases, custom metadata may have been created for object A and stored in association with object A at the data source 104. The workflow task 128 may be configured to recognize and use this custom metadata. For example, the custom metadata may be streamed (i.e., copied) as one or more custom metadata streams 714. The custom metadata streams 714 may be processed using one or more content classes to extract desired custom metadata values 716 that may be believed to be useful to users in searching for data related to the object A.

The one or more search engine indexes 136 may be global to the entire system and, consequently, consume system resources in terms of storage, memory, and processing time for creating the indexes 136. To assist administrators in minimizing the cost of these indexing resources, the content classes herein provide for simplified de-duplication of index fields across various schemas 142. For example, if two different content classes (or two different content properties within a single content class) both define a "Doctor Name" field, it may be beneficial for both properties to share the same index field name under a same content property name so that the values corresponding to this index field are effectively not duplicated in the index 136.

In addition, the management application 118 may include a user interface for managing the index 136, which may include a schema builder 718 that lets users define fields for the index 136. As mentioned above, the report generator 126 may generate a report 138 from some or all of the documents 140. The report 138 may include information about the processed data and corresponding metadata that may be used to create the index 136. Accordingly, the schema builder 718 is able to determine how large a field to make for each index field that will be included in the index 136 based on the report 138. In addition, in some examples the one or more indexes 136 may be exported to one or more external search computing devices 720. For instance, the exported index 722 may be used alone or with other indexes (not shown in FIG. 7) to provide a search engine, or the like, to the client devices 110 or to other users.

After the index 136 has been generated by the index generator 124, in some examples, the search application 120 may generate information for providing a search engine user interface (UI) 724. For example, the search application 120 may send, to a client device 110, one or more webpages or other information for presenting the search engine UI 724 at the client device 110 in response to a request from the client device 110. Accordingly, as mentioned above, the client device 110 may submit a query to the search application 120 via the search engine UI 724. The search application 120 may apply the query to the index 136, determine one or more results from the index 136, and provide the results to the client device 110 through the search engine UI 724. Additional details of the search engine UI 724 are discussed below.

Figure 8:
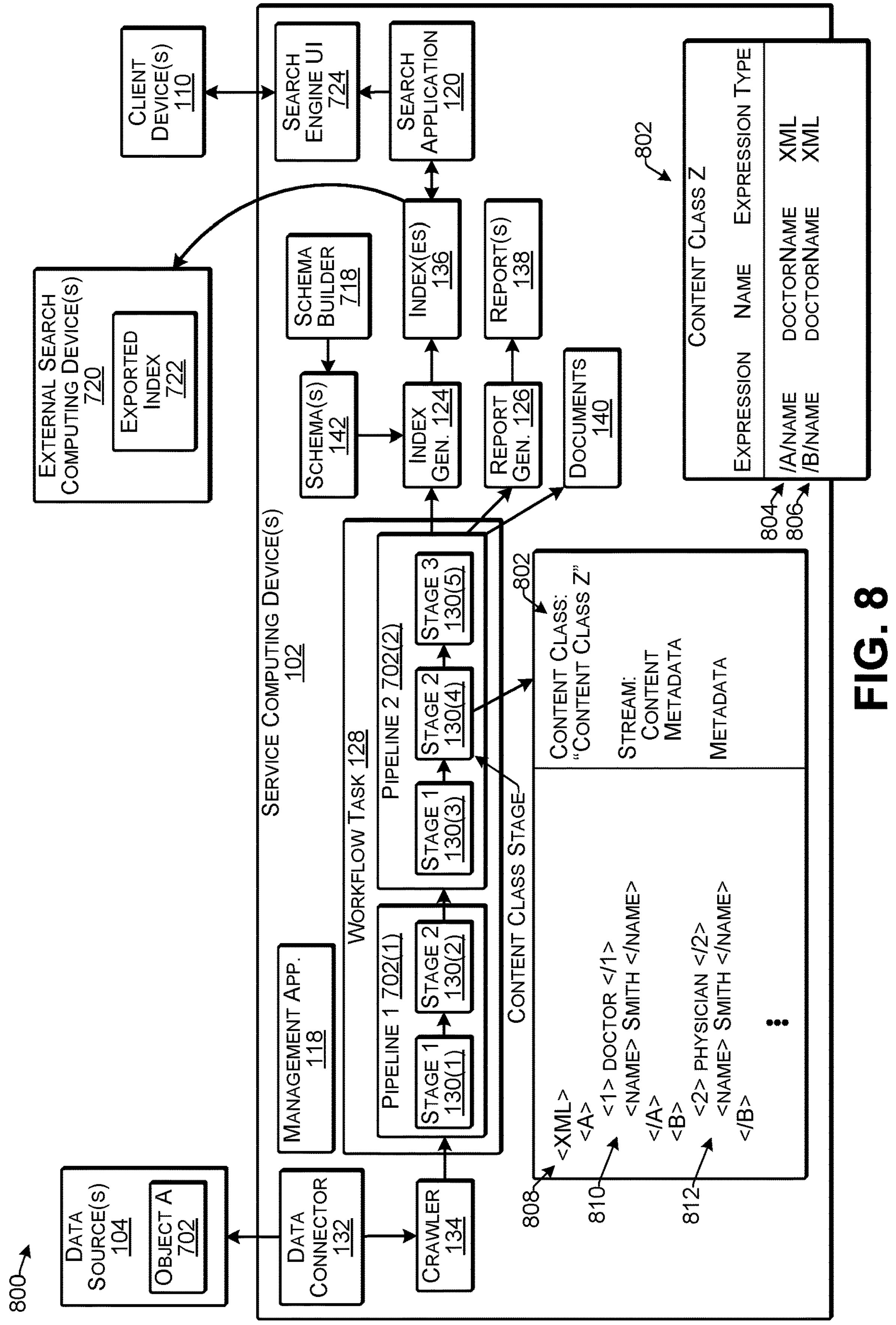
FIG. 8 illustrates an example workflow task including pipeline processing according to some implementations.

FIG. 8 illustrates an example in which a content class stage is included in the workflow 128 according to some implementations. For example, a user may configure one or more of the pipelines 702 with one or more content class stages 130. In the illustrated example, suppose that the second stage 130(4) of the second pipeline 702(2) is a content class stage. The content class stage 130(4) may apply one or more of the content classes herein to the documents 140 processed by the workflow task 128 to draw additional metadata from the custom metadata and/or the object data content to enhance the metadata for the object, such as in a manner intended by an administrator or other user of the system.

By including the content class stage, the workflow task 128 is able to utilize one or more content classes to obtain a desired indexing behavior for each of the data sources accessed. As a result, the system indexes only content properties specified in the content classes and system metadata, and is able to identify indexed content by the content property names. Because specific applications typically generate custom metadata for data objects based on the same schema, the content classes may be used to define, package, and manage the custom metadata across an object storage ecosystem. As mentioned above, each content class includes a set of one or more content properties. Each content property may include a name field to specify the content property name and an expression field to identify how the content property's value is to be extracted from content of the metadata. The content property may further include an expression type field that identifies the expression type, a data type field to specify a data type (e.g., string, int, float, Boolean, etc., as enumerated elsewhere herein) of the content property's value, a format field to specify formatting for numbers and date data types, and/or a multi-value field to specify whether the expression specified in the content property can evaluate to multiple values within the same metadata content. The workflow may search content of the one or more objects using the content properties of the content class to derive values for indexing that correspond to the content properties. In some examples, some of the plurality of content properties may be applied to the content data of the object and some of the content properties may be applied to metadata of the object.

In the example of FIG. 8, suppose that a content class 802 included in the content class stage 130(4) is titled "Content Class Z" and includes a first content property 804 and a second content property 806. The Content Class Z may be applied against content and/or metadata corresponding to a stream, and/or may be applied to system metadata, depending on the nature of the content properties included in the content class Z. In the illustrated example, the first content property 804 may be configured to extract a doctor name from a first part of an XML file while the second content property 806 may be configured to extract a doctor name from a different part of the XML file. An example XML file corresponding to the content properties 804 and 806 is illustrated at 808 and includes a first portion 810 in which the doctor name is associated with the word "doctor" and a second portion 812 in which the doctor name is associated with the word "physician'. Regardless of these associations, however, the expression "/A/name" in the first content property 804 is configured to extract the name of the doctor, i.e., "Smith" in this example, from the first portion 810 of the XML file 808, and the expression "/B/name" in the second content property 806 is configured to extract the name of the doctor, i.e., "Smith" in this example, from the second portion 812 of the XML 808. Furthermore, this content class consolidates the doctor name under a single name field, i.e., "doctorName", which avoids having duplicative entries created in the index for both "doctor" and "physician".

Figure 9:
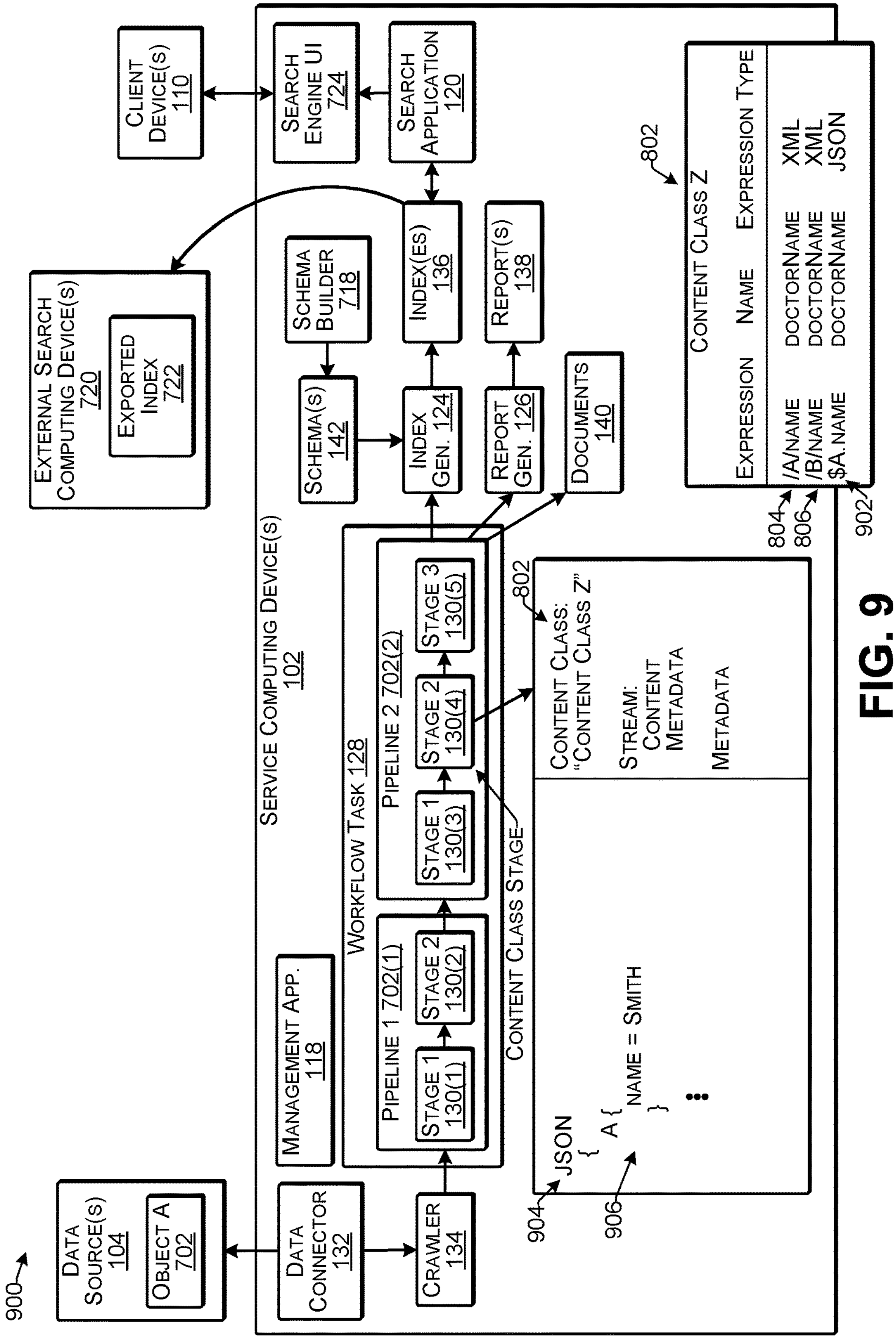
FIG. 9 illustrates an example workflow task including pipeline processing according to some implementations.

FIG. 9 illustrates an example 900 in which a content class stage is included in the workflow 128 according to some implementations. In this example, suppose that the content class Z 802 includes a third content property 902 for extracting a doctor name from JSON code. Accordingly, when JSON code 904 is received by pipeline stage 130(4), the name of the doctor, "Smith", is extracted from a location 906 in the JSON text specified by the JSONPath expression "$A.name" indicated in the content property 902.

Figure 10:
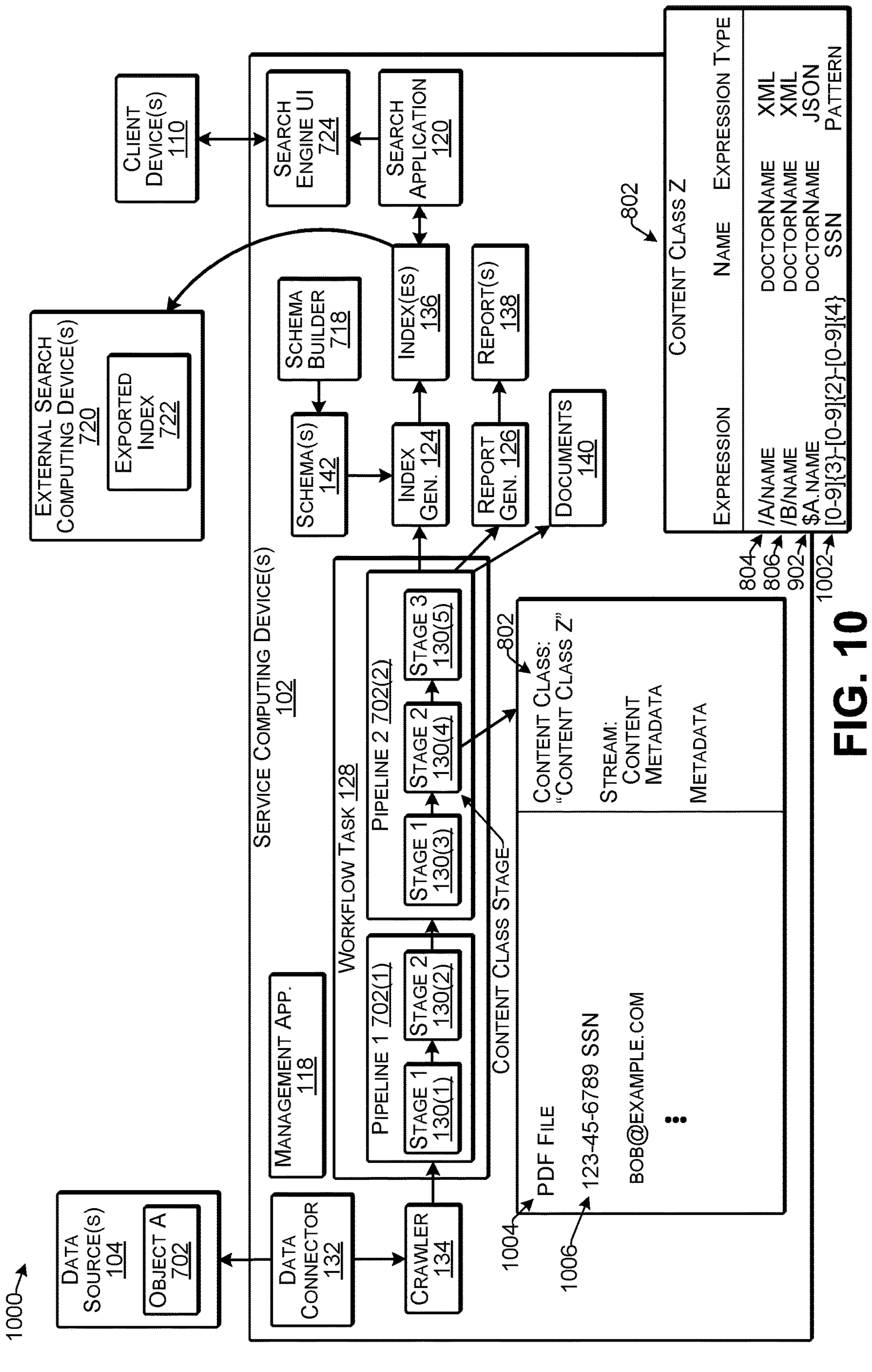
FIG. 10 illustrates an example workflow task including pipeline processing according to some implementations.

FIG. 10 illustrates an example 1000 in which a content class stage is included in the workflow 128 according to some implementations. In this example, suppose that the content class Z 802 includes a fourth content property 1002 for extracting a social security number (SSN) from a text file based on a regular expression Pattern type expression "M[0-9]{3}-[0-9]{2}-[0-9]{4}". Accordingly, when a PDF file 1004 is received by pipeline stage 130(4), the SSN is extracted from the text 1006 of the PDF file 1004 based on matching the Pattern expression indicated in the content property 1002.

FIG. 11 illustrates an example of a portion of an index 1100 that may be generated according to some implementations. In addition to enabling keyword searching using a general inverted index of strings (e.g., words, names, etc.), implementations herein may enable structured searches, such as based on the content properties defined for the content classes. As described above, when the workflows herein process metadata content using content classes, the content classes are configured for the objects being processed. The workflows herein may index custom metadata content by looking up content classes that are applicable for the object being indexed, determining content properties that are defined in those content classes, and applying those content properties to the content to extract values from the content. Thus, the workflow may evaluate the expressions of all content properties against the content being indexed and, as a result, the index generator only indexes the values that match the expressions.

As mentioned above, the content classes provide a technique for viewing content property configurations across a variety of data sources from a single location (instead of viewing each configuration at each data source). This allows for simplified de-duplicating of index fields across various schemas. For example, if two different content classes both define a "doctorName" field, it may be beneficial for both properties to share the same index field name so that the values are effectively de-duplicated in the index.

FIG. 11 illustrates a portion of an index created based on a content property, i.e., doctorName. For example, the doctorName may be the name of the content property, and the index 1100 may include a list 1102 of all doctor names located and an associated list 1104 of document identifiers associated with each instance of each doctor name.

When searching for data, such as data associated with a particular doctor, the user can search for content using any of the defined content properties, such as by using a content property's human-readable name (e.g., "doctorName" in this example). The system matches the property name to the internal index field to find appropriate result. For example, the search query "doctorName: 'John Smith'" may result in information about three documents C489032, 34244BC, 232F783 (and/or the corresponding data objects) being presented to the user as the results of the query. In some examples, to assist users with searching, the search interface may provide the user with a list of appropriate content classes and content property names to be chosen from, such as in an intuitive graphic user interface using, e.g., a drop-down list, menu, or the like.

Figure 12:
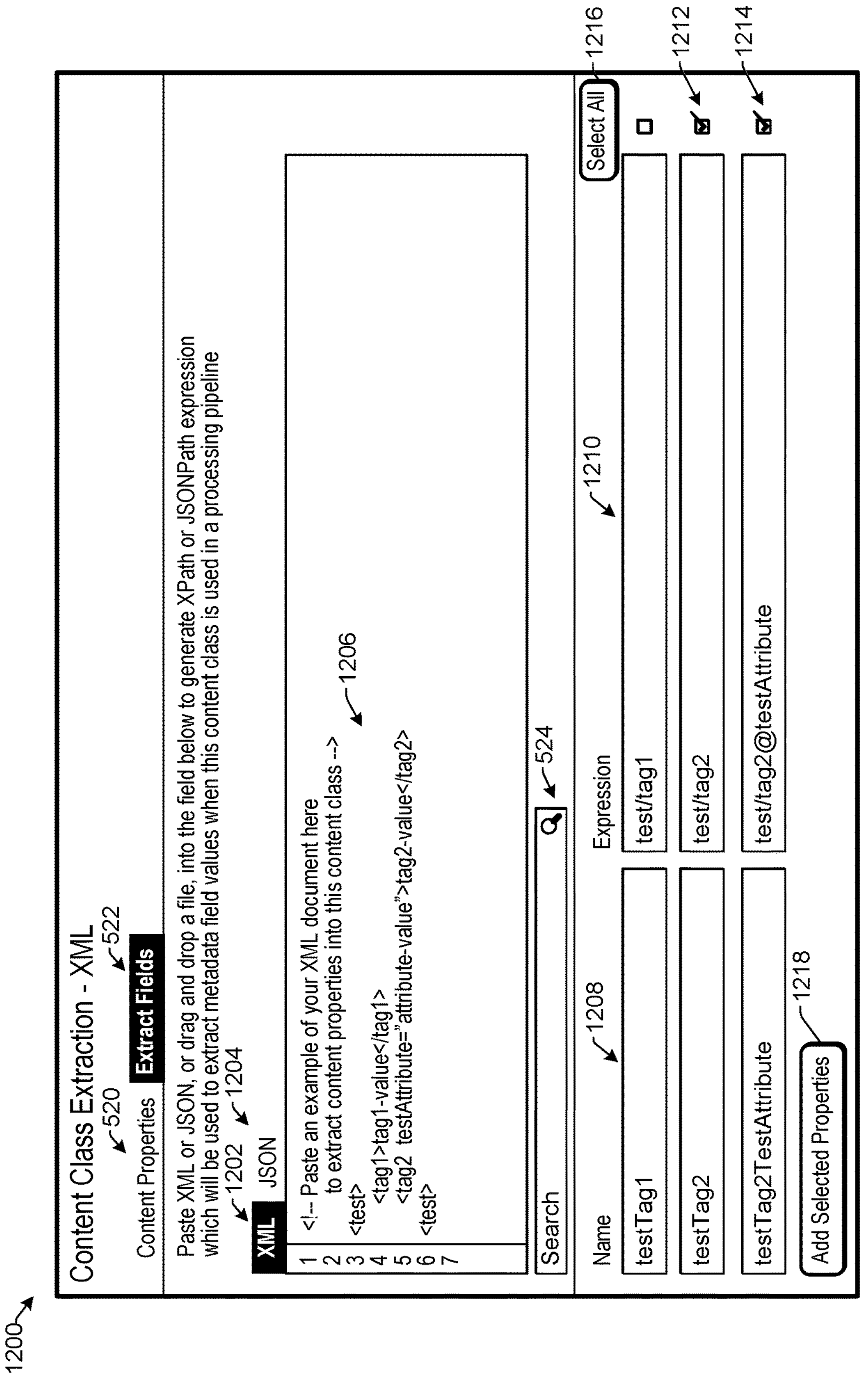
FIG. 12 illustrates an example recommendation user interface according to some implementations.

FIG. 12 illustrates an example user interface 1200 for recommending expressions for content properties according to some implementations. In this example, the "extract fields" tab 522 is highlighted to indicate that the user interface 1200 is presenting a recommendation interface. In particular, the management application 118 may include a recommendation capability for recommending content property expressions to the user. Thus, the user can paste an expected real-life data text snippet (i.e., XML in this example) into the presented user interface 1200, and may receive several valid recommended XPath expressions that can be used to extract desired data values from similarly structured data and/or metadata.

In the illustrated example, suppose that the user has selected an XML tab 1202. Alternatively, the user may select a JSON tab 1204, as discussed below with respect to FIG. 13. Furthermore, suppose that the user has pasted XML text 1206 at lines 1-6 in the user interface. The recommendation functionality of the management application may automatically derive XPath expressions from portions of the XML text 1206 and present the expressions in the user interface 1200. In this example, the user interface 1200 presents recommended names 1208 and recommended expressions 1210. For instance, when determining recommended names and/or expressions, the management application may scan an existing index and/or schema to determine if there are matching or related names or expressions. If so, those may be selected as candidates for the recommendations. The user may select one or more of the recommendations, such as by selecting a check box associated with each recommendation, as indicated at 1212 and 1214. Alternatively, if the user wants to select all the recommendations, the user may select a "select all" button 1216. When the user desires to add the selected recommendations to a content class, the user may select an "add selected properties" button 1218. The selected expressions may then be directly added as content properties to a content class that the user is currently defining. The expression type for the created content properties may be automatically populated, such as based on the selected XML tab 1202.

FIG. 13 illustrates an example user interface 1300 for recommending expressions for content properties according to some implementations. In this example, suppose that the user has selected the JSON tab 1204. Furthermore, suppose that the user has pasted JSON text 1302 at lines 1-8 in the user interface. The recommendation functionality of the management application may automatically derive JSON-Path expressions from portions of the JSON text 1302 and present the expressions in the user interface 1300. In this example, the user interface 1300 presents the recommended names 1208 and the recommended expressions 1210. For instance, when determining recommended names and/or expressions, the management application may scan an existing index and/or schema to determine if there are matching or related names or expressions. If so, those matching or related names may be selected as candidates for the recommendations. The user may select one or more of the recommendations, such as by selecting a check box associated with each recommendation, as indicated at 1304 and 1306. Alternatively, if the user wants to select all the recommendations, the user may select the "select all" button 1216. When the user desires to add the selected recommendations to a content class, the user may select the "add selected properties" button 1218. The selected expressions may then be directly added as content properties to a content class that the user is currently defining. The expression type for the created content properties may be automatically populated, such as based on the selected JSON tab 1204.

Figure 14:
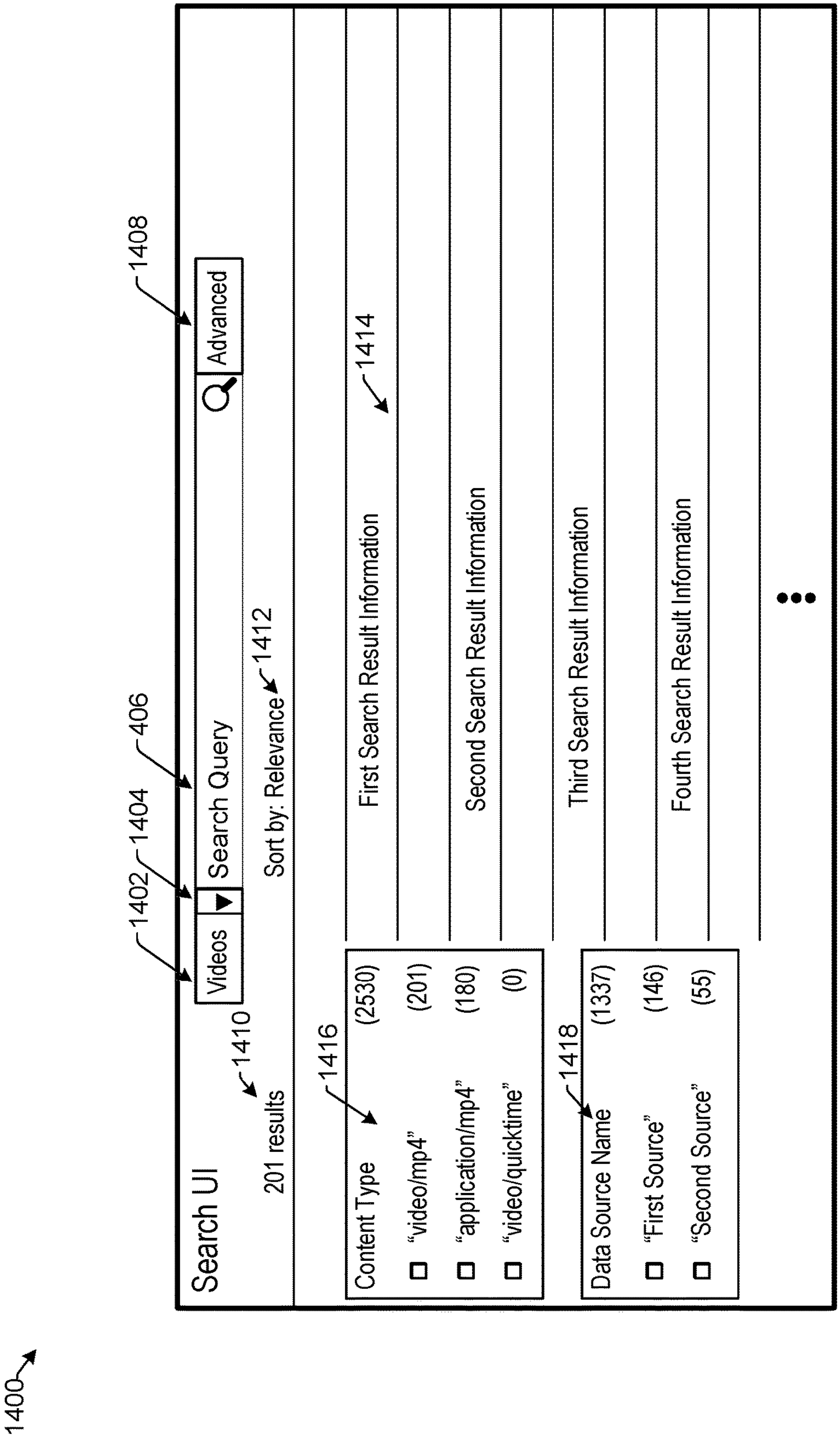
FIG. 14 illustrates an example search interface according to some implementations.

FIG. 14 illustrates an example search interface 1400 that may be presented on the client device for submitting a search query according to some implementations. For instance, the search interface 1400 may be a search page, such as an HTML page, presented to an end user who desires to conduct a search for data. The administrator may have some control over which fields are presented to the user in the search interface 1400. Further, in some examples, the search interface 1400 may provide search features such as faceting, paging, and federated search. For example, with faceting, the user may initially search in all areas, but may gradually focus the search into a particular area by selecting facets relevant to the target of the search. For instance, the search may initially be in images. The search may subsequently be narrowed to medical images, and may be further narrowed to searching in MRI images, and so forth. The facets may be provided by the content properties herein.

In the example of FIG. 14, the search interface 1400 is configured to enable searching in a videos index, as indicated at 1402. Further, as indicated at 1404, the user may select a dropdown menu to search across all available indexes. The user may enter a query in a query field 1406 and/or may select an advanced search option 1408 if additional search options are desired.

Furthermore, the search interface 1400 may indicate the number of returned results, as shown at 1410, and may indicate the sorting technique used for the results, as shown at 1412. In addition, the search results 1414 may be presented in the sorted order. Further, the search interface 1400 may enable the user to narrow the results based on content type, as indicated at 1416, and/or based on data source name, as indicated at 1418. For example, the user may select the one or more of the content types 1416 to view search results corresponding to the selected content type(s). In some cases, the content types 1416 may correspond to content properties that were determined for the data using the techniques discussed above. Further, in some examples, as discussed above with respect to FIG. 11, the search interface 1400 may provide a structured search for a large number of content property names. For example, the user may select the dropdown menu 1404 to view the available search fields corresponding to indexed content property names, such as in the "doctorName" example described above with respect to FIG. 11. Accordingly, the content properties herein may be used to provide more efficient search results by enabling more focused searching of the indexed content.

FIGS. 15-18 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks and systems described in the examples herein, although the processes may be implemented in a wide variety of other environments, frameworks and systems.

Figure 15:
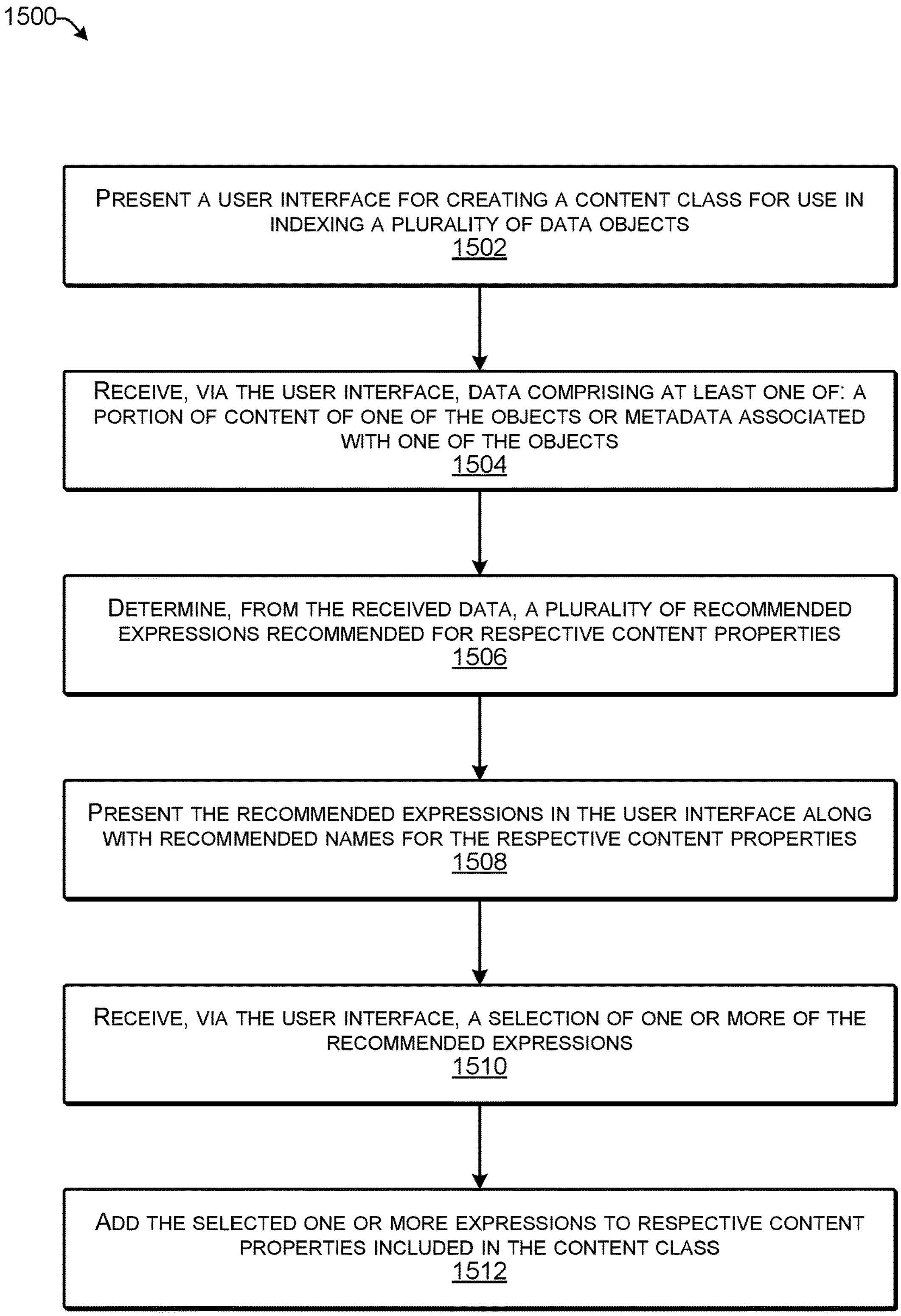
FIG. 15 is a flow diagram illustrating an example process for recommending one or more content properties according to some implementations.

FIG. 15 is a flow diagram illustrating an example process 1500 for recommending content properties according to some implementations. In some examples, the process 1500 may be executed by the service computing device 102 or other suitable computing device.

At 1502, the computing device may present a user interface that enables creating a content class for use in indexing a plurality of data objects. For example, a content class may include a set of one or more content properties. Each content property may include a name and an expression for extracting a value from data associated with an object.

At 1504, the computing device may receive, via the user interface, data comprising at least one of: a portion of content of one of the objects or metadata associated with one of the objects. For example, the user may cut and paste, drag, or otherwise insert into the user interface a portion of data associated with an object, such as content data or metadata, which may include custom metadata.

At 1506, the computing device may determine, from the received data, a plurality of recommended expressions recommended for respective content properties. For instance, in the case that the received data is XML code, the computing device may use XPath to derive a plurality of expressions that point to locations of values in the received data. In the case that the received data is JSON code, the computing device may use JSONPath to derive a plurality of expressions that point to locations of values in the JSON code.

At 1508, the computing device may present the recommended expressions in the user interface along with recommended names for the respective content properties. In some examples, the names and or the recommended expressions may be determined based on information present in an existing index or schema. In other examples, a user may be able to browse an existing index or schema to determine optimal terminology for a content property name and/or expression.

At 1510, the computing device may receive, via the user interface, a selection of one or more of the recommended expressions. In some cases, the user may edit the recommended expressions and/or recommended names prior to accepting a selection of particular recommendations.

At 1512, the computing device may add the selected one or more expressions to respective content properties included in the content class. For example, the user interface may automatically add selected expressions and corresponding names to the content class the user is defining.

Figure 16:
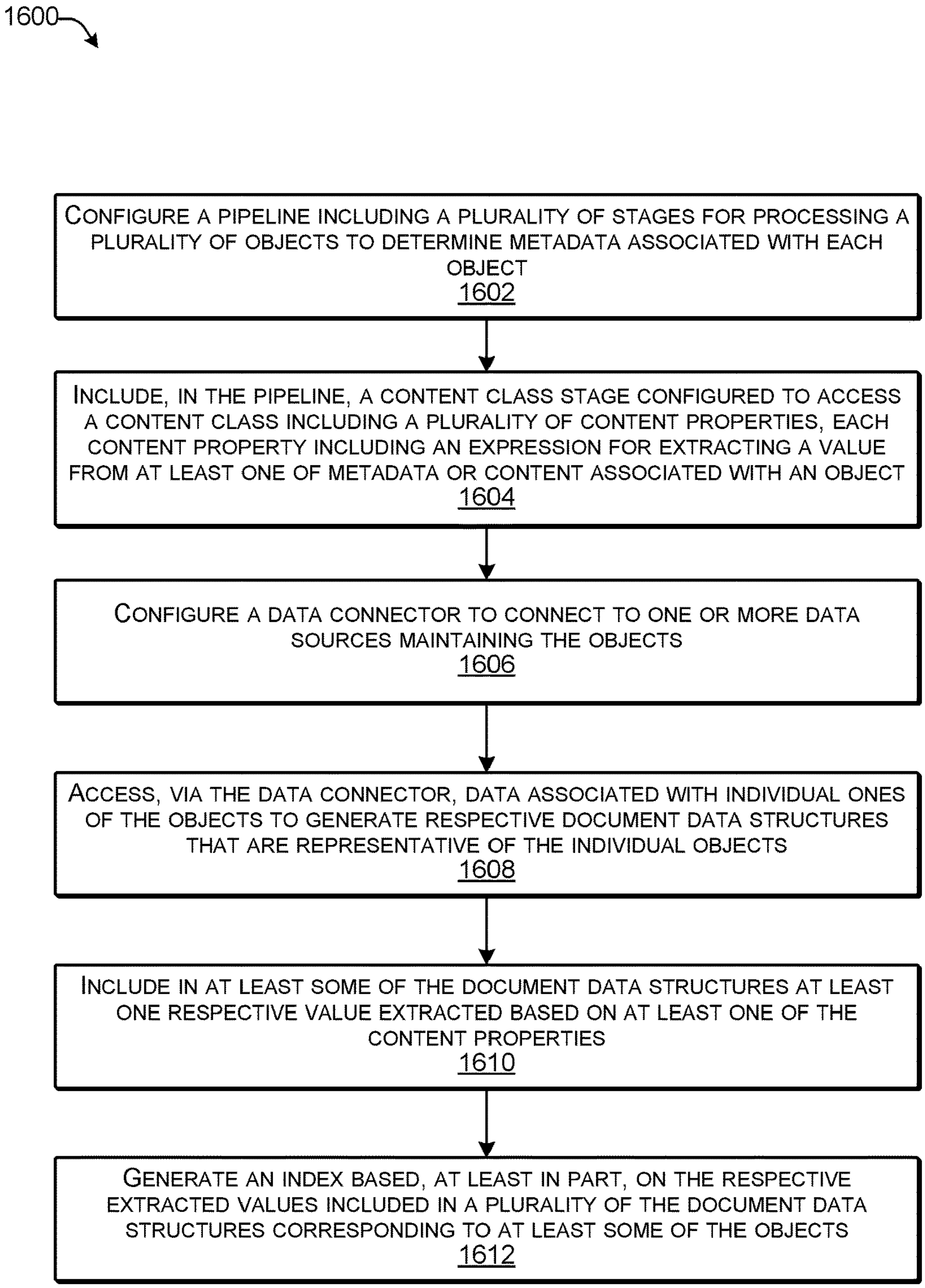
FIG. 16 is a flow diagram illustrating an example process for processing object data according to some implementations.

FIG. 16 is a flow diagram illustrating an example process 1600 for generating an index according to some implementations. In some examples, the process 1600 may be executed by the service computing device 102 or other suitable computing device.

At 1602, the computing device may configure a pipeline including a plurality of stages for processing a plurality of objects to determine metadata associated with each object. For example, a user may use a user interface to instruct the management application regarding a desired configuration of a pipeline and the management application may assemble a workflow task including the specified pipeline stages.

At 1604, the computing device may include, in the pipeline, a content class stage configured to access a content class including a plurality of content properties, each content property including an expression for extracting a value from at least one of metadata or content associated with an object. For instance, the user may instruct the management application to include one or more content class stages in a workflow task.

At 1606, the computing device may configure a data connector to connect to one or more data sources maintaining the objects.

At 1608, the computing device may access, via the data connector, data associated with individual ones of the objects to generate respective document data structures that are representative of the individual objects. For instance, a crawler may crawl the data at a selected data source.

At 1610, the computing device may include, in at least some of the document data structures, at least one respective value extracted based on at least one of the content properties. For example, as discussed additionally at FIG. 17, the content properties may be used to identify and extract desired data values from object data.

At 1612, the computing device may generate an index based, at least in part, on the respective extracted data values included in a plurality of the document data structures corresponding to at least some of the objects.

Figure 17:
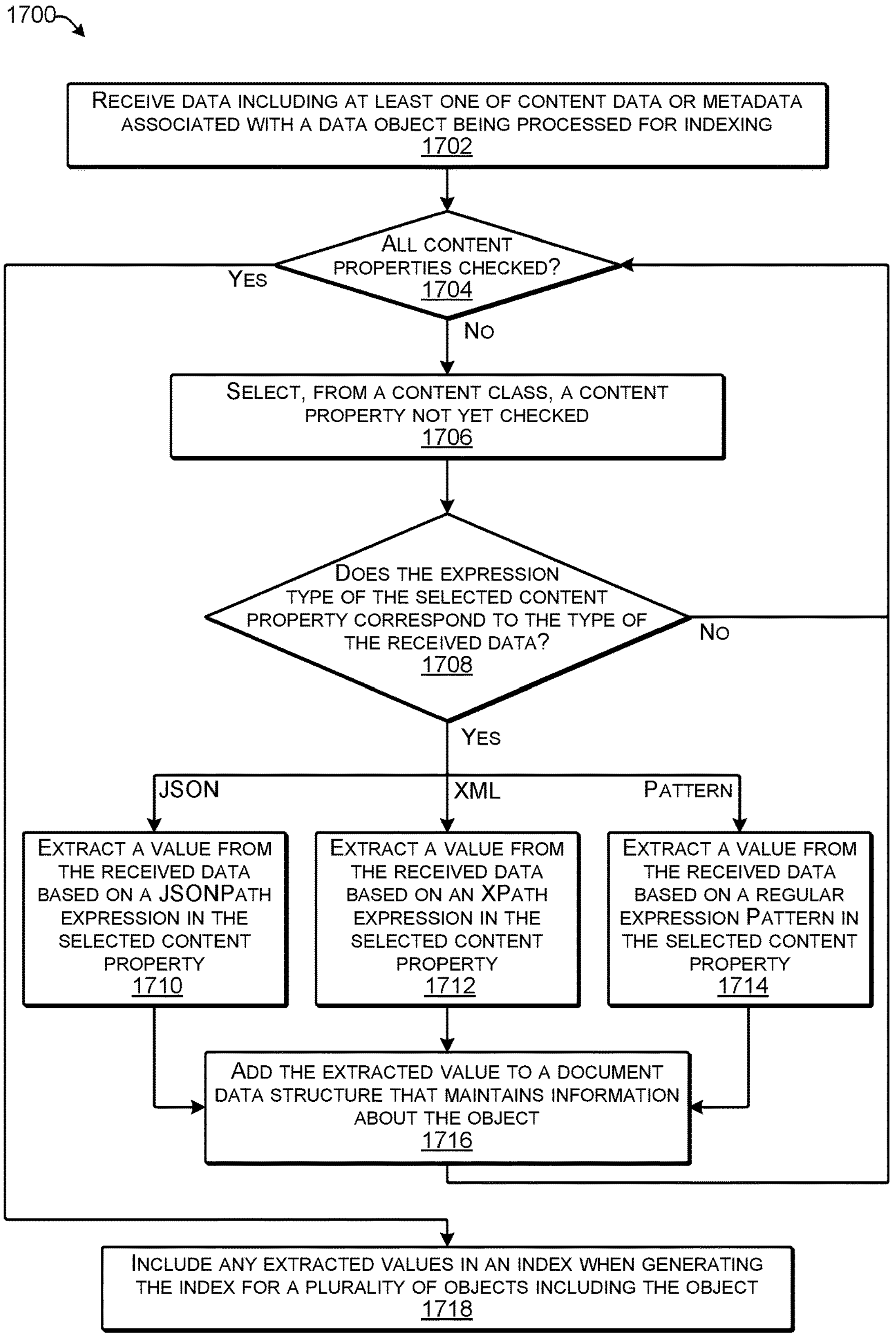
FIG. 17 is a flow diagram illustrating an example process for using content properties to extract data values from object data according to some implementations.

FIG. 17 is a flow diagram illustrating an example process 1700 for extracting data values from received object data based on one or more content properties according to some implementations. In some cases, the process 1700 may be executed by the service computing device 102 or other suitable computing device, such as at a content class stage of an object data processing pipeline or during other processing of object data.

At 1702, the computing device may receive at least one of content data and/or metadata corresponding to an object that is being processed for indexing.

At 1704, the computing device may determine whether all content properties in all content classes have been checked in comparison to the received data. If so, the process proceeds to block 1718. If not, the process proceeds to block 1706.

At 1706, the computing device may select, from a content class, a content property not yet checked in comparison to the received data.

At 1708, the computing device may determine whether the expression type of the selected content property corresponds to the type of the received data. In other words, if the expression type of the selected content property is XML, the computing device determines if the received data includes XML code; if the expression type of the selected content property is JSON, the computing device determines if the received data includes JSON code; and if the received data does not include XML or JSON, the computing device determines if the received data includes unstructured text that may be compared with a regular expression pattern. If the received data does not match or otherwise correspond to the expression type in the selected content property, the process may return to block 1704 to determine whether there are any other content properties to be compared with the received data. On the other hand, if the expression type matches, or otherwise corresponds to, the received data type, the process proceeds to one of blocks 1710, 1712, or 1714, depending on the type of the received data.

At 1710, if the type of the received data is JSON, the computing device may extract a value from the received data based on a JSONPath expression in the selected content property.

At 1712, if the type of the received data is XML, the computing device may extract a value from the received data based on an XPath expression in the selected content property.

At 1714, if the type of the received data is unstructured text, the computing device may extract a value from the received data based on a regular expression pattern in the selected content property.

At 1716, the computing device may add the extracted data value to a document data structure that maintains information about the object. The extracted data value may be stored in the document data structure in association with the name of the content property that caused the data value to be extracted. The process then returns to block 1704 to determine whether there are any content properties that have not yet been checked. If all content properties for all content classes have been checked for the received data, the process proceeds to block 1718.

At 1718, the computing device may include any extracted data values in an index when generating the index for a plurality of objects including the object.

Figure 18:
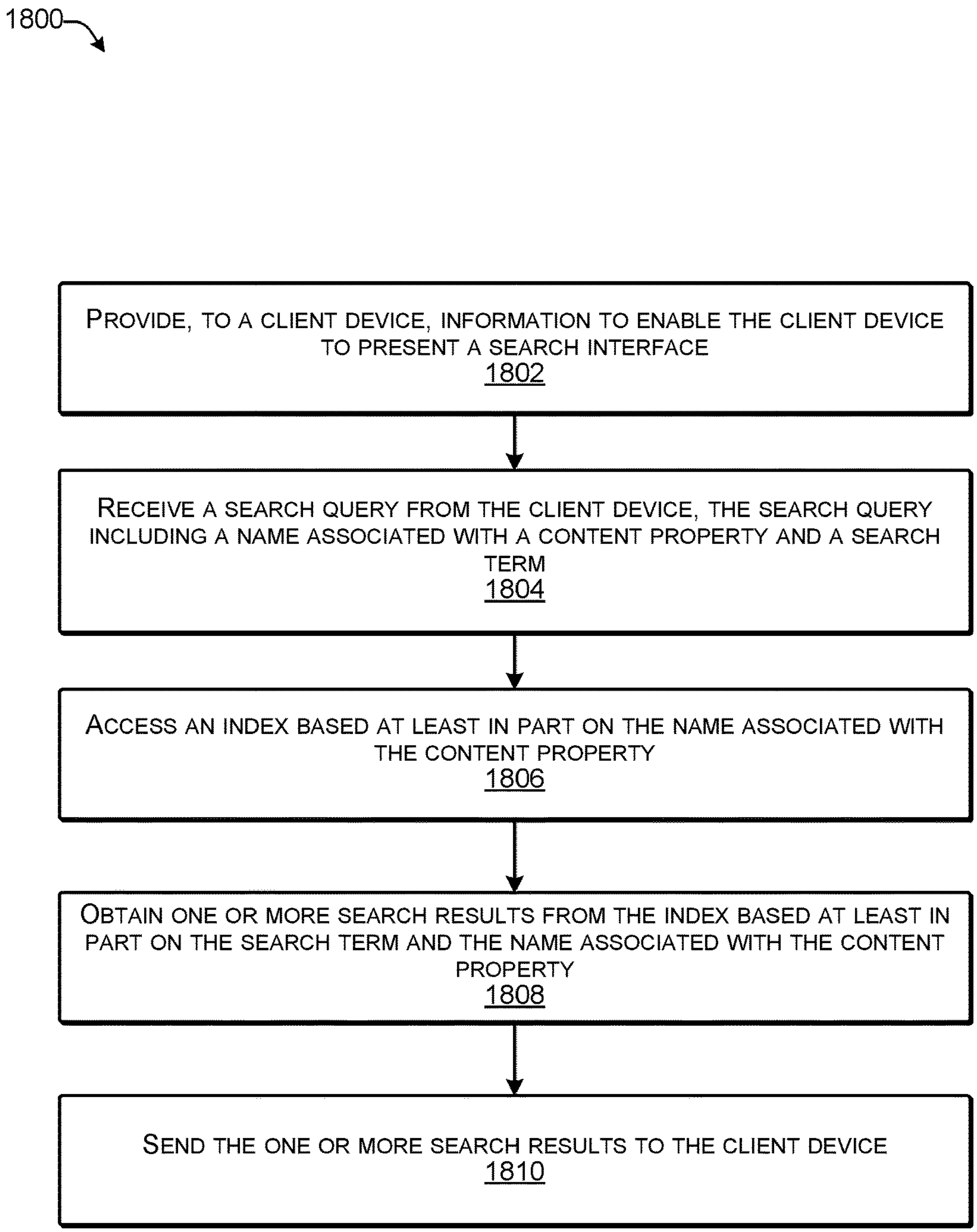
FIG. 18 is a flow diagram illustrating an example process for searching object data according to some implementations.

FIG. 18 is a flow diagram illustrating an example process 1800 according to some implementations. In some cases, the process 1800 may be executed by the service computing device 102 or other suitable computing device.

At 1802, the computing device may send, to a client device, information to enable the client device to present a search interface. In some examples, as discussed above with respect to FIGS. 11 and 14, the search interface may provide a structured search for a large number of content property names.

At 1804, the computing device may receive a search query from the client device, the search query including a name associated with a content property and a search term.

At 1806, the computing device may access an index based at least in part on the name associated with the content property.

At 1808, the computing device may obtain one or more search results from the index based at least in part on the search term and the name associated with the content property.

At 1810, the computing device may send the one or more search results to the client device. For example, the search results may include URIs of the data corresponding the search results and a brief snippet of description and/or an image for each search result.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:

one or more processors; and one or more non-transitory computer-readable media maintaining executable instructions, which, when executed by the one or more processors, program the one or more processors to perform operations comprising:

presenting a user interface configured for determining recommended expressions to add to content classes for indexing data objects, the user interface including a first field configured to receive a portion of text extracted from an object, the user interface further including at least one second field configured to present at least one recommended expression determined based at least on the portion of text received into the first field;

receiving data associated with a first object to be indexed, the data comprising at least one of content data or metadata;

in response to receiving, into the first field of the user interface, a first portion of text extracted from the data associated with the first object to be indexed, determining, by the one or more processors, based at least on a portion of data associated with another object, an expression recommended to be added, as a content property, to a content class currently being defined;

presenting, in the at least one second field in the user interface, the expression recommended to be added;

receiving, via the user interface, a selection of the expression to add as the content property to the content class, the content property including the expression for determining a data value;

based at least in part on determining that a type of the expression corresponds to a type of the received data, extracting the data value from the received data based on the expression; and saving the data value to a data structure in association with a name of the content property.

2. The system as recited in claim 1, wherein the determining that the type of the expression corresponds to the type of the received data comprises:

determining that the type of the expression is extensible markup language (XML); and determining that the received data includes XML code.

3. The system as recited in claim 2, wherein the expression is expressed in XPath or other syntax for defining parts of the XML code.

4. The system as recited in claim 1, wherein the determining that the type of the expression corresponds to the type of the received data comprises:

determining that the type of the expression is JSON; and determining that the received data includes JSON code.

5. The system as recited in claim 1, wherein the expression is expressed in JSONPath or other syntax for defining parts of the JSON code.

6. The system as recited in claim 1, wherein the determining that the type of the expression matches the type of the received data comprises:

determining that the type of the expression is a regular expression pattern; and determining that the received data includes unstructured text.

7. The system as recited in claim 1, wherein the content property is one of a plurality of content properties included in the content class, the operations further comprising:

receiving additional data associated with the object;

selecting another content property from the content class, the other content property having another expression for determining another data value; and based at least in part on determining that a type of the other expression corresponds to a type of the additional data, extracting the other data value from the additional data based on the other expression, wherein the type of the other expression is different from the type of the expression.

8. The system as recited in claim 1, the operations further comprising:

receiving the data over a network from a data source through a data connector; and generating the data structure, wherein the data structure is representative of the object and includes at least a portion of the metadata associated with the object and information related to the content data of the object.

9. The system as recited in claim 1, the operations further comprising:

processing the received data through a series of stages configured in a plurality of software pipelines, wherein the determining that the type of the expression corresponds to the type of the received data is performed at one of the stages in the at least one software pipeline;

configuring a first one of the software pipelines to include a first series of stages and a second one of the software pipelines to include a second series of stages; and providing an output of the first software pipeline as an input to the second software pipeline.

10. The system as recited in claim 1, further comprising:

generating an index based at least in part on the name of the content property and a plurality of the data structures determined for a plurality of respective different objects, wherein the index includes an entry based at least in part on the data value extracted from the received data.

11. The system as recited in claim 10, the operations further comprising:

sending information related to a search interface to a client device;

receiving, from the client device, a search query, wherein the search query includes, at least in part, the name of the content property; and obtaining one or more search results from the index based at least in part on the name of the content property included with the search query.

12. The system as recited in claim 1, the operation of determining the expression recommended for the content property further comprising determining one or more expressions that point to a location of a piece of data in the portion of data associated with the other object.

13. A method comprising:

presenting, by one or more processors, a user interface configured for determining recommended expressions to add to content classes for indexing data objects, the user interface including a first field configured to receive a portion of text extracted from an object, the user interface further including at least one second field configured to present at least one recommended expression determined based at least on the portion of text received into the first field;

receiving, by the one or more processors, data associated with a first object to be indexed, the data comprising at least one of content data or metadata;

in response to receiving, into the first field of the user interface, a first portion of text extracted from the data associated with the first object to be indexed, determining, by the one or more processors, based at least on a portion of data associated with another object, a first expression recommended to be added, as a first content property, to a content class being defined;

presenting, in the at least one second field in the user interface, the first expression recommended to be added;

receiving, via the user interface, a selection of the first expression to add as the first content property, the first content property including the first expression for determining a first data value;

based at least in part on determining that a type of the first expression corresponds to a type of the received data, extracting the first data value from the received data based on the first expression; and saving the first data value to a data structure in association with a name of the first content property.

14. The method as recited in claim 13, wherein the type of the first expression is one of XML, JSON, or unstructured text, the method further comprising:

receiving additional data associated with the object;

selecting a second content property from the content class, the second content property having a second expression for determining a second data value; and based at least in part on determining that a type of the second expression corresponds to a type of the additional data, extracting the second data value from the additional data based on the second expression, wherein the type of the second expression is one of XML, JSON or unstructured text, and is different from the type of the first expression.

15. The method as recited in claim 13, further comprising:

generating an index based at least in part on the name of the first content property and a plurality of the data structures determined for a plurality of respective different objects, wherein the index includes an entry based at least in part on the first data value extracted from the received data.

16. The method as recited in claim 13, further comprising:

processing the received data through a series of stages configured in at least one software pipeline, wherein the determining that the type of the expression corresponds to the type of the received data is performed at one of the stages in the at least one software pipeline; and generating, by the at least one pipeline, for the object, the data structure as a document data structure associated with the object, the document data structure including metadata associated with the object and at least one available content stream for the object.

17. One or more non-transitory computer-readable media storing instructions that, when executed by one or more processors, program the one or more processors to:

present a user interface configured for determining recommended expressions to add to content classes for indexing data objects, the user interface including a first field configured to receive a portion of text extracted from an object, the user interface further including at least one second field configured to present at least one recommended expression determined based at least on the portion of text received into the first field;

receive data associated with a first object to be indexed, the data comprising at least one of content data or metadata;

in response to receiving, into the first field of the user interface, a first portion of text extracted from the data associated with the first object to be indexed, determine, based at least on a portion of data associated with another object, an expression recommended to be added, as a content property, to a content class currently being defined;

present, in the user interface, the expression recommended to be added;

receive, via the user interface, a selection of the expression to add as the content property to the content class, the content property including the expression for determining a data value;

based at least in part on determining that a type of the expression matches a type of the received data, extract the data value from the received data based on the expression; and save the data value to a data structure in association with a name of the content property.

18. The one or more non-transitory computer-readable media as recited in claim 17, the one or more processors further programmed to:

process the received data through a series of stages configured in a plurality of software pipelines, wherein the determining that the type of the expression corresponds to the type of the received data is performed at one of the stages in one of the software pipelines;

configure a first one of the software pipelines to include a first series of stages and a second one of the software pipelines to include a second series of stages; and provide an output of the first software pipeline as an input to the second software pipeline.

19. The one or more non-transitory computer-readable media as recited in claim 17, the one or more processors further programmed to:

generate an index based at least in part on the name of the content property and a plurality of the data structures determined for a plurality of respective different objects, wherein the index includes an entry based at least in part on the data value extracted from the received data.

20. The one or more non-transitory computer-readable media as recited in claim 17, the one or more processors further programmed to:

process the received data through a series of stages configured in at least one software pipeline, wherein the determining that the type of the expression corresponds to the type of the received data is performed at one of the stages in the at least one software pipeline; and generate, by the at least one pipeline, for the object, the data structure as a document data structure associated with the object, the document data structure including metadata associated with the object and at least one available content stream for the object.

* * * * *